(12) United States Patent
Brouillette et al.

(10) Patent No.: US 7,337,606 B2
(45) Date of Patent: Mar. 4, 2008

(54) ROTARY RAMJET ENGINE

(75) Inventors: Martin Brouillette, Sherbrooke (CA); Jean-Sébastien Plante, Sherbrooke (CA)

(73) Assignee: Universite De Sherbrooke, Sherbrooke (Quebec) (CA)

( * ) Notice: Subject to any disclaimer, the term of this patent is extended or adjusted under 35 U.S.C. 154(b) by 114 days.

(21) Appl. No.: 10/414,477

(22) Filed: Apr. 16, 2003

(65) Prior Publication Data

US 2004/0020185 A1 Feb. 5, 2004

(30) Foreign Application Priority Data

Apr. 16, 2002 (CA) .................................. 2382382

(51) Int. Cl.
*F02C 3/14* (2006.01)
(52) U.S. Cl. ........................ 60/39.35; 60/39.34; 60/768
(58) Field of Classification Search ............... 60/39.34, 60/39.35, 776–779
See application file for complete search history.

(56) References Cited

U.S. PATENT DOCUMENTS

| | | | | |
|---|---|---|---|---|
| 2,544,420 | A | * | 3/1951 | Goddard .................... 60/39.35 |
| 2,709,889 | A | * | 6/1955 | Mount ........................ 60/39.35 |
| 3,118,227 | A | * | 1/1964 | Wormser .................... 60/39.95 |
| 3,971,209 | A | | 7/1976 | de Chair |
| 4,199,296 | A | | 4/1980 | de Chair |
| 5,372,005 | A | | 12/1994 | Lawlor |
| 5,709,076 | A | | 1/1998 | Lawlor |
| 6,263,660 | B1 | | 7/2001 | Lawlor |
| 6,279,309 | B1 | | 8/2001 | Lawlor et al. |
| 6,298,653 | B1 | | 10/2001 | Lawlor |
| 6,334,299 | B1 | | 1/2002 | Lawlor |
| 6,347,507 | B1 | | 2/2002 | Lawlor |
| 6,510,683 | B1 | * | 1/2003 | Lawlor ....................... 60/39.35 |

FOREIGN PATENT DOCUMENTS

WO  WO-88/00155  1/1988

OTHER PUBLICATIONS

Robert Acebal, IEEE Transactions on Magnetics, vol. 33, No. 1, pp. 753-762, Jan. 1997.
Robert Acebal; IEEE Transactions on Magnetics, vol. 35, No. 1, pp. 317-322, Jan. 1999.
Anonymous, Jan. 2000, Engine Briefs, Automotive Engineering International, vol. 108, No. 1, pp. 61-63.
William H. Avery; Jet Propulsion, vol. 25, No. 11, pp. 604-614, Nov. 1955.
F. S. Billig; Journal of Propulsion and Power, vol. 9, No. 4, pp. 499-514, Jul.-Aug. 1993.

(Continued)

*Primary Examiner*—Ted Kim
(74) *Attorney, Agent, or Firm*—Birch, Stewart, Kolasch & Birch, LLP

(57) ABSTRACT

An engine for providing rotary power about an output shaft with a high power-to-weight ratio includes a plurality of flow guiding blades mounted on the inner surface of an annular thruster base. The flow guiding blades cooperate with the peripheral surface of a rotor for forming a plurality of ramjet-like thrusters. The configuration of the flow guiding blades allows for optimization of the number of thrusters. The centrifugal forces generated by the rotating components is compensated by an annular reinforcement wall made with high strength materials allowing for downsizing of the rotor and associated components.

26 Claims, 16 Drawing Sheets

OTHER PUBLICATIONS

Stuart Birch; Automotive Engineering International, vol. 109, No. 6, pp. 25-28, Jun. 2001.
G. S. Bloch et al.; Transactions of the ASME, vol. 121, No. 1, pp. 28-35, Jan. 1999.
M. Brouillette et al.; One-Dimensional Analysis of the Ram Accelerator, First International Workshop on Ram Accelerator, St-Louis (France), French-German Research Institute of Saint-Louis, p. 1-16, Sep. 1993.
A.P. Bruckner et al.; Investigation of 3D Reacting Flow Phenomena in a 38 mm Ram Accelerator, First International Workshop on Ram Accelerator, St-Louis (France), French-German Research Institute of Saint-Louis, p. 1-27, Sep. 1993.
J.-L. Cambier at al.; Journal of Propulsion and Power, vol. 14, No. 4, pp. 489-498, Jul.-Aug. 1998.
Paul J. Carpenter et al.; Investigation of a ram-jet powered helicopter rotor on the Langley helicopter test tower, NACA Research Memorandum, RM L53D02, p. 1-32, 1953.
E.T. Curran et al.; Annual Review of Flluid Mechanics, vol. 28, pp. 323-360, 1996.
Antonio Ferri; Annual Review of Fluid Mechanics, vol. 5, pp. 301-338, 1973.
S. M. Gee et al.; Journal of Materials Science, vol. 26, No. 4, pp. 1093-1100, Feb. 1991.
Abraham Hertzberg; The Ram Accelerator: An adventure in Research, First International Workshop on Ram accelerator, St-Louis (France), French-German Research Institute of Saint-Louis, p. 1-15, Sep. 1993.
Henry R. Hunczak et al.; Characteristics of Perforated Diffusers at Free-Stream Mach No. 1.90, NACA Research Memorandum, RM E50B02, p. 69, 1950.
James E.A. John; Gas Dynamics, Boston, 1st ed., Allyn and Bacon, p. 394, 1969.
C. Knowlen et al.; Experimental Correlation of Ram Accelerator Hugoniot Theory, First International Workshop on Ram Accelerator, St-Louis (France), French-German Research Institute of Saint-Louis, p. 1-12, Sep. 1993.
W. M. Konig et al.; Journal of Turbomachinery, vol. 117, No. 1, pp. 81-87, Jan. 1996.
K. Kosaka et al.; Application of Carbon-Carbon Composite to Scramjet Engines, Proceedings of the 9th International Symposium on Air Breathing Engines, Washington DC, AIAA, vol. 1, A90-12501 02-07, pp. 359-364, Sep. 1989.
A. Kantrowitz; The Supersonic Axial-Flow Compressor, NACA Report 974, ARC L6D02, pp. 473-481, 1946.
John Lee et al.; Investigation of The Potential and Limitations of The Ram Accelerator, Final Report, Defence Research Establishment Suffield, 2nd ed., McGill University, 1994.
S.M. Lee; International Encyclopedia of Composites, 1st ed., VCH Publishers, tome 1, pp. 158-185, 1990.
Erwin A. Lezberg et al.; Weight flow and thrust limitations due to use of rotating combustors in a turbojet engine, NACA Research Memorandum, RM E55K16, p. 1-30, 1956.
Eric Loth et al.; Detonation Internal Combustion Engine Concept, Proceedings of the 15th Annual Fall Technical Conference of the ASME Internal Combustion Engine Division, Morgantown (WV), ASME Internal Combustion Engine Division, vol. 20, pp. 177-185, Sep. 1993.
S. S. Manson; Determination of Elastic Stresses in Gas-Turbine Disks, NACA, Technical Note NACA-TN-1279, p. 1-30, 1947.
S. S. Manson; Direct Method of Design and Stress Analysis of Rotating Disks with Temperature Gradient, NACA Report 952, p. 103-116, 1950.
S. A. Monks; Thesis, Preliminary Assessment of a Rotary Detonation Engine Concept, Naval Postgraduate School, Sep. 1983, Monterey, CA.
Gary Pruett; e-mail conversation, Hitco Carbon Composite Inc., Feb. 2000.
Pratt & Whitney Canada, PW 206D; Pamphlet 220949, Montreal, 2nd ed. p. 2, 1997.
Paul Proctor; Pulse Detonation Technologies Advance, Aviation Week and Space Technology, vol. 148, No. 18, pp. 48-50, May 1998.
Edward J. Radin et al.; Comparison of the Performance of a Helicopter Type Ramjet Engine Under Various Centrifugal Loadings, NACA Research Memorandum, RM L53H18a, p. 1-17, 1953.
Ramgen Power Systems; www.ramgen.com, 2001.
Donald L. Schmidt et al.; Unique Applications of Carbon-Carbon Composite Materials (Part Two), SAMPE Journal, vol. 35, No. 4, pp. 51-63, Jul.-Aug. 1999.
D. L. Tweedt et al.; Experimental Investigation of the Performance of a Supersonic Compressor Cascade, Journal of Turbomachinery, vol. 110, No. 4, pp. 456-466; Oct. 1988.
Shuichi Ueda et al.; Fabrication and Test of a Carbon-Carbon Composite Combustion Chamber for a Low Thrust Storable Engine, Proceedings of the 16th International Symposium on Space Technology and Science, Tokyo, Japan, AGNE Publishing, vol. 1, A-89-38031 16-12, pp. 229-234, May 1988.
J.W. Weeton et al.; Engineer's Guide to Composite Materials, Ohio, 1st ed., Metals Park, pp. 8.39-44; 1987.
R.E. York et al.; Supersonic Compressor Cascades—An Analysis of the Entrance Region Flow Field Containing Detached Shock Waves, Journal of Engineering for Power, Transactions of the ASME, pp. 247-257, Apr. 1976.

* cited by examiner

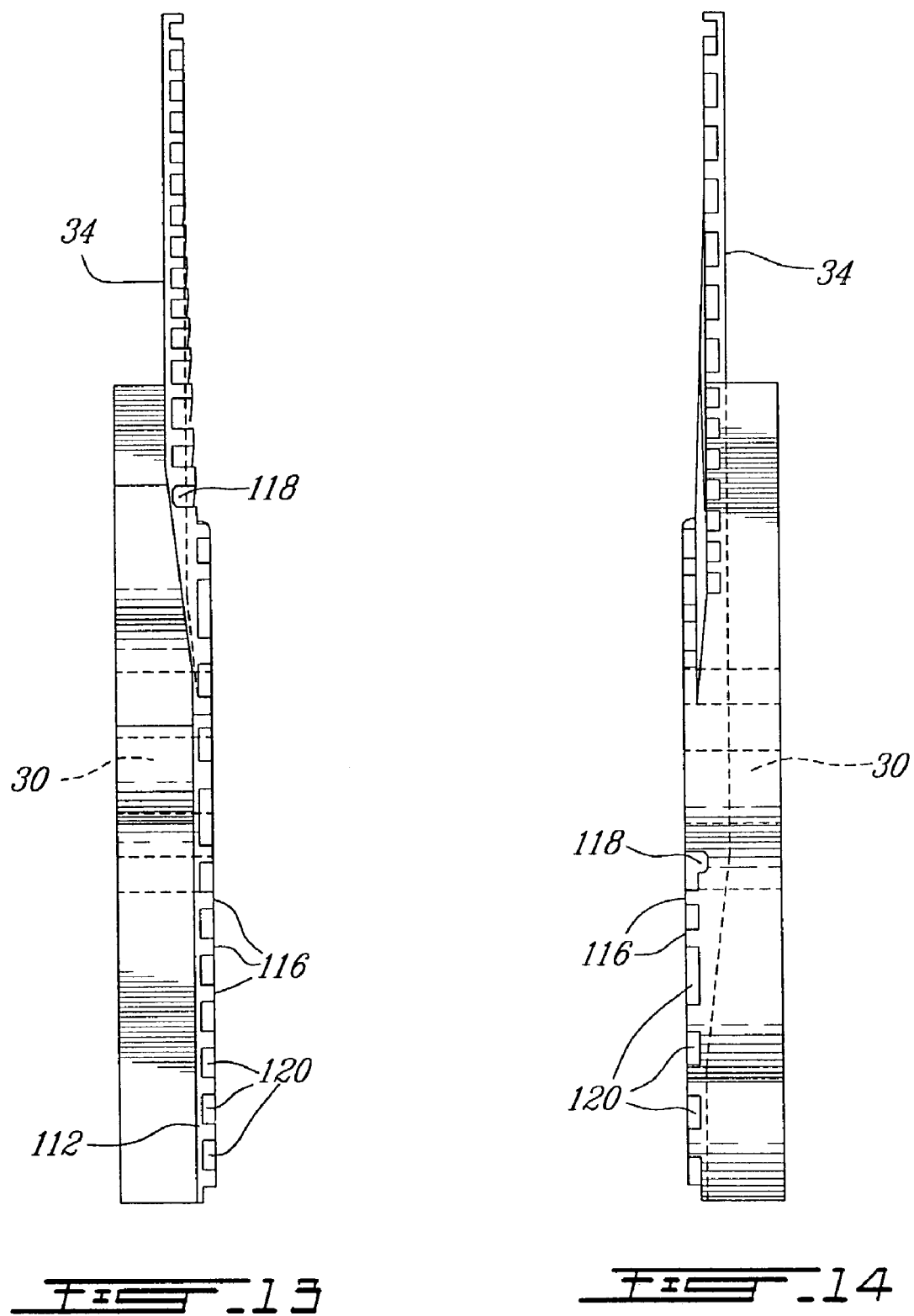

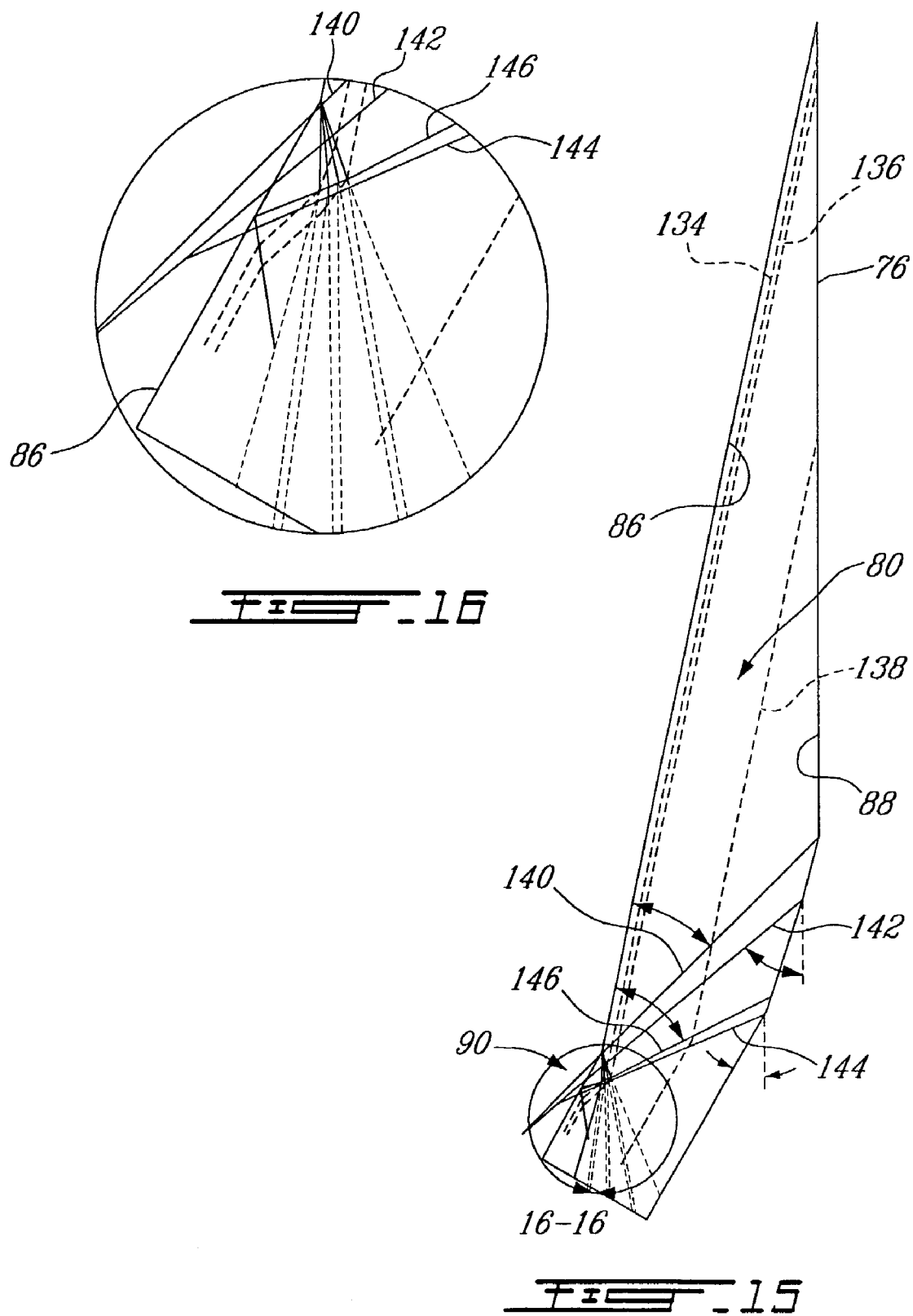

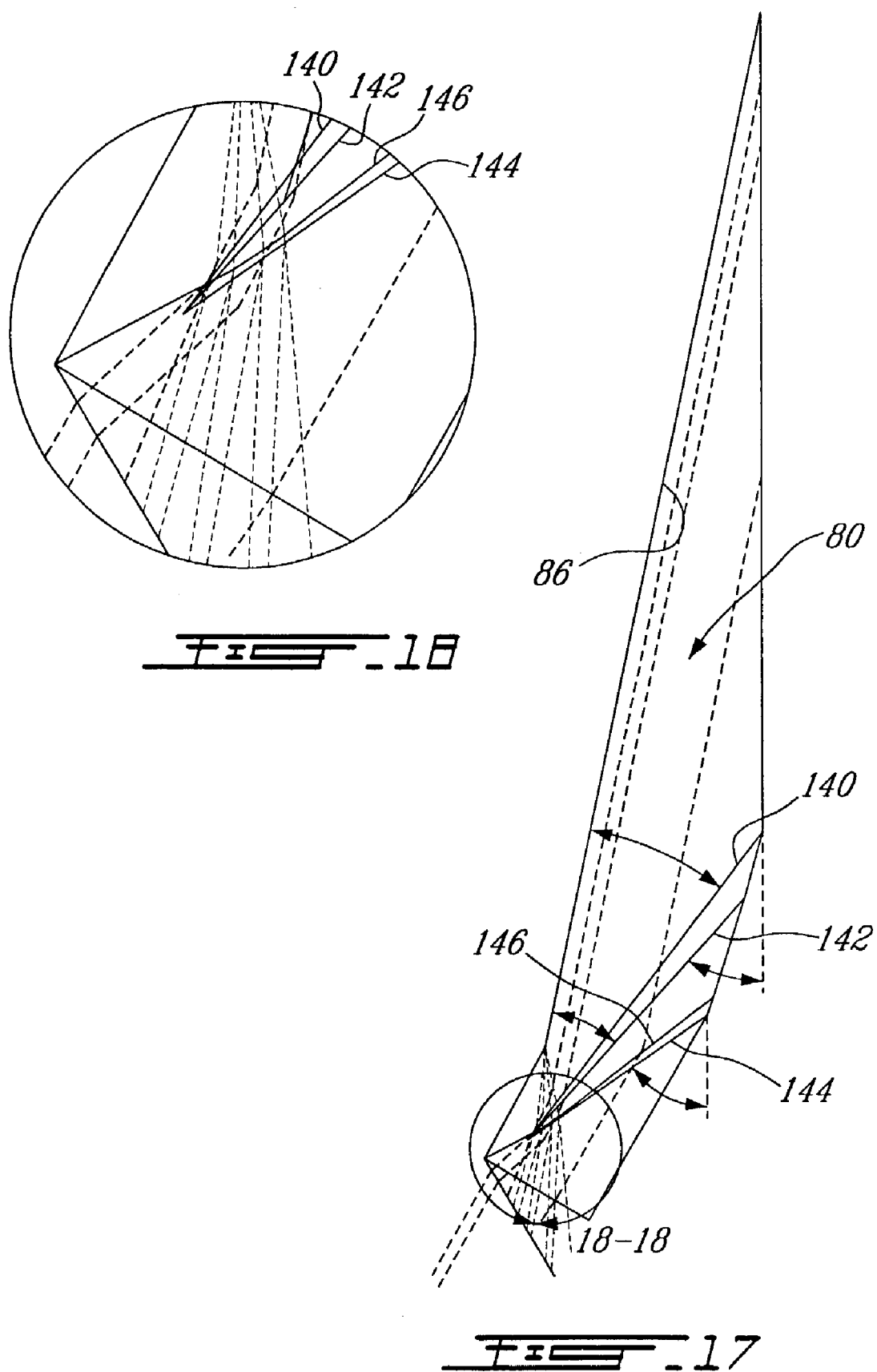

ROTARY RAMJET ENGINE

FIELD OF THE INVENTION

The present invention relates to the general field of engines for producing mechanical power and is particularly concerned with a rotary ramjet engine.

BACKGROUND OF THE INVENTION

The conversion of chemically stored energy into useful work has been the goal of engine designers since the creation of internal combustion engines utilizing the Otto cycle. As is well known, the most widely available devices nowadays for converting fossil fuel energy into rotational power are the Otto and Diesel cycle reciprocating internal combustion engines and the Brayton cycle gas turbines.

The reciprocating or piston-type internal combustion engines typically demonstrate relatively low fuel efficiency. Indeed, typically less than 20% of the chemical energy stored in the fuel is transformed into useful mechanical energy. This relatively low efficiency is imputable to many factors.

For example, complex mechanical systems are required to transform the reciprocating motion of the piston into the rotary motion of the drive shaft. Also, the mechanical properties of the materials used for building conventional combustion chambers significantly limits the allowable temperature and pressure in the combustion chamber and, thus, limits the thermal efficiency of the engine.

Furthermore, with most conventional reciprocating internal combustion engines, the combustion of the fuel occurs at ordinary rates. These ordinary rates of combustion result into prolonged heating of the combustion chamber which produces more degradation at the chamber wall per unit volume of fuel burned than when the fuel is burned at a faster rate. This, in turn, limits the specific power or power-to-weight ratio of the engine.

Rotary engines compared to reciprocating engines significantly reduce the mechanical complexity by eliminating the need to transform the reciprocating piston motion to rotary motion of the drive shaft. The prior art is replete with various types of rotary engines in which the rotor has a plurality of circumferentially spaced combustion chambers formed with ducts to exhaust combustion products in order to provide reaction forces. However, most conventional rotary engines do not provide substantially improved efficiency or power-to-weight ratio over the conventional reciprocating engines probably at least in part because the combustion of fuel still occurs at ordinary rates.

In view of the scarcity and high costs of engine fuels, engine designers and engineers have been grappling mostly with the fundamental problems of exhaust emissions and pollutants and increased fuel economy, yet striving to improve performance in these areas without sacrificing already compromised engine performance and efficiency. Over time, numerous proposals have been set forth to reduce pollution and increase engine and fuel performance. Each has some distinct disadvantage because of its interaction with other engine parameters inherent in the Otto or Diesel cycle engines.

Although engine designing efforts have been directed mostly towards these fundamental problems and, in particular, towards improving the efficiency of the fuel-to-work conversion, other engine parameters may in some situations be considered at least as important. For example, in some specific settings, the so-called specific power or power-to-weight ratio is sometimes considered a crucial design and operational criteria.

For example, it is well known that with various types of vehicles, weight may become a critical factor. Indeed, extra weight in vehicles such as automobiles and airplanes in particular require substantial propulsion power and also reduce maneuverability. When the specific power of the engine is not optimized, the engine itself may constitute an important fraction of the total vehicle weight. Accordingly, many types of vehicles could greatly benefit from a simple propulsion system having a relatively high power-to-weight ratio in order to minimize the overall vehicle mass.

Furthermore, there also exist many situations wherein engines are only required to provide power for limited periods of time. Some of these situations would also greatly benefit from an overall reduction of the engine weight and, hence, optimization of the specific power since the engine may be considered as a "dead mass" for most of the operational cycle.

In the field of aerospace, typical examples of situations wherein optimization of the specific power could prove to be particularly interesting include upholding of the gyroscopic stabilization of satellites, generating power for space weapons and tools, providing power for future human space stations, motorizing some of the mechanisms during spatial machines take-off, providing propulsion for personal flight vehicles and so forth.

In the automotive industry, hybrid vehicles in particular could potentially greatly benefit from an engine able to demonstrate a relatively high specific power. Indeed, in such hybrid vehicles, piston engines are sometimes used as generators and peak power leveler engines to counterbalance the lower power and relatively low autonomy of conventional batteries. Such vehicles would hence greatly benefit from auxiliary engines having a relatively high specific power that could be used as a peak leveler. Also, electrically powered vehicles such as an hydrogen fuel cell electric vehicle could benefit from an engine adapted to act both as a constant or near constant energy storage flywheel and as a peak power supplier when needed such as during acceleration.

In the field of biomechanics various devices such as limb prosthesis or the like could also greatly benefit from a relatively light actuator able to provide relatively short bursts of power. In general, any application wherein there exists a need for a providing peak power for relatively small periods of time and without sacrificing weight criterias could benefit from an engine optimized for specific power.

As is well known, of the currently available energy converters, the so-called gas turbine appears as one of the best design in terms of specific power. Conventional gas turbine engines have generally included a stationary combustion chamber or burner where injected kerosene or other fuel and air from a compressor is mixed and burned. The burnt gas may pass through a duct which directs it against the blade of a rotating turbine blade wheel that delivers through its shaft. High efficiency and high power output from such engines depend on the use of gas jets of high energy being directed at the turbine blade wheel. However, if the jet energy increases to a substantially high level, large thermal and mechanical stresses are imposed on the blade which may cause mechanical failure.

Indeed, relatively large mechanical stresses are produced in available engines by reason of the high rotational speeds for typical turbine blade wheel diameters. When these mechanical stresses are combined with high temperatures imposed by the gas jet, the conditions become close to the limit of strength of the best available turbine blade materials.

Higher gas jet energy can be readily obtained, but they cannot be efficiently used since if the blade wheel is allowed to rotate faster, this causes excessive mechanical stress, while if the gas jet is moving too fast relative to the blade, for example more than about Mach 1, then this causes excessive heating of the blade.

Typically, with conventional gas turbine engines, long cycle life is obtained by using large quantities of extra air to produce gas released at moderate temperature and velocity and by using moderate rotational speed of the turbine blade wheel. The result is relatively low efficiency even for large units and limited power output for a given size of engine.

The mechanical resistance of the materials used for building the gas turbines is hence often considered the limiting factor that hinders or limits the specific power performances of conventional gas turbines. Also, conventional gas turbines are usually not considered as a commercially interesting high specific power propulsion system because of their inherent high costs and complexity.

The need for providing engines capable of demonstrating a relatively high specific power while has been recognized in the prior art. One of the proposed solutions involves the use of shock waves instead of mechanical compressors for compressing the combustible fluid. Since shock waves allow for relatively high rotational speeds, relatively low pressures are required to obtain potentially interesting power values as opposed to conventional turbo-engines requiring relatively large forces because of their relatively low rotational speed.

Various types of thrusters using shock wave combustion to provide thrust are known. For example, ramjets are widely known and have been used primarily in aerospace applications since the 1940. In an aerospace propulsion ramjet, air in ingested into an engine inlet at supersonic speeds caused by the forward motion of an airplane or missile. The air is rammed into a smaller opening between a center-body and the engine side wall generating a series of shock waves. These shock waves compress and decelerate the air to subsonic speeds while, at the same time, dramatically raising working flow pressure and temperature.

The ramjet effect may also be achieved in a stationary platform by passing an accelerated flow of air over raised sections machined on the rim of a rotor disc. Combined with the high rotation rate of the rotor, this produces a supersonic flow relative to the rotor rim. Interaction between the raised sections of the rim which are rotating at supersonic speeds and the stationary engine case creates a series of shock waves that compress the air stream in a manner similar to ramjet inlets on a supersonic missile or aircraft.

Over the years, the combustion chamber configuration, the configuration of ramjet engine inlets, the fuel injection requirements and ignition requirements have been the subject of much studies and technical development. Ramjets have also been experimentally employed to assist in the rotation of helicopter blades about a central shaft.

The prior art has further shown examples of rotary motors using shock wave combustion produced by the so-called ramjet effect. For example, U.S. Pat. Nos. 5,372,005 et 5,709,076 both naming S. P. Lawlor as inventor and issued respectively in 1994 and 1998 disclose both a method and an apparatus for generating power using rotating ramjets which compress inlet air and expand exhaust gases against stationary peripheral walls.

The engine disclosed in the hereinabove mentioned patents is commonly referred to as a ramgen. The ramgen typically includes a pair of thrusters mounted in a diametrically opposed relationship relative to each other on the engine rotor The tangential thrust produced by the thrusters provides the rotational output power. Although interesting, the ramgen nevertheless suffers from inherent drawbacks. One of these drawbacks relate to the fact that the inlet air of a given thruster may be potentially contaminated by the exhaust air of the other thruster. A large fan positioned upstream relative to the ramgen inlet must hence be used in order to discharge exhaust gases.

Also, ramgen-type engines are mainly designed for the production of electrical and mechanical power at medium size electrical or mechanical power plants. Such medium size mechanical or electrical power plants, typically in the range of 10 to 100 megawatts are typically required in industrial applications including stationary electric power generating units, rail locomotives, marine power systems and the like.

Power plants in this general size range are also typically suited for use in industrial co-generation facilities increasingly employed to service industrial thermo-power needs while simultaneously generating electrical power. Obviously, ramgen-type engines are mainly concerned with the efficient conversion of fuel input to electrical output as opposed to being concerned with specific power. Accordingly, design choices such as the use of only two thrusters inherently limit the ability of ramgen-type engines to provide high specific power.

The prior art has also shown some examples of other types of rotary supersonic combustion chambers. For example, U.S. Pat. Nos. 3,971,209 and 4,199,296 both naming R. S. Chair as inventor and issued respectively in 1976 and 1990 disclose respectively various embodiments of gas generators and gas turbine engines. The structure disclosed in the above-mentioned patents is commonly referred to as a rambine.

The rambine, although somewhat interesting, may be considered as "self-propelled compressor-combustion chamber combination" as opposed to an autonomous engine. Furthermore, the angle of attack at the inlet diffuser of the rambine typically does not coincide with the radial direction of the engine as is the case with conventional compressors. This may potentially limit the overall performance of the rambine.

Accordingly, there exists a need for an improved engine allowing for the conversion of chemically stored energy into output power with relatively high specific power characteristics.

OBJECTS OF THE INVENTION

It is a general object of the present invention to provide a mechanical engine having a relatively high power-to-weight and high power-to-volume ratio when converting chemically stored energy into mechanical output power.

SUMMARY OF THE INVENTION

In accordance with the present invention, there is provided a rotary engine for producing an output power about an output shaft, the output shaft extending substantially along a shaft axis, the engine comprising: a thruster disposed for rotary motion along a substantially circular thruster path positioned in a rotary plane substantially perpendicular to the shaft axis, the thruster being capable of generating a thruster torque about the shaft axis, the thruster generating a thruster centrifugal force acting thereon when rotating along the thruster path; a thruster-to-shaft coupling means operatively coupled to both the thruster and the output shaft for transmitting the thruster torque to the output shaft; an independent centrifugal force compensating means operatively coupled to the thruster for reacting to the centrifugal force and compensating for the latter so as to maintain the thruster in the thruster path when the thruster is rotated in the rotary plane; whereby the thruster-to-shaft coupling means and the centrifugal force compensating means are allowed to perform their respective force transmitting and compensating function substantially independently from each other so as to substantially reduce the need for the thruster-to-shaft coupling means to react to and compensate for the centrifugal force.

Conveniently, thruster-to-shaft coupling means includes: a mechanical coupling component configured and sized for extending substantially radially between the output shaft and the thruster; a coupling component-to-thruster attachment means for attaching the mechanical coupling component to the thruster; a coupling component-to-shaft attachment means for attaching the coupling component to the output shaft.

Typically, the thruster-to-shaft coupling means allows the thruster and the mechanical coupling component to expand and retract substantially radially substantially independently from each other.

Conveniently, the mechanical coupling component includes a generally disc-shaped rotor defining a pair of opposed rotor side surfaces and a radially outermost rotor peripheral surface, the rotor defining a rotor rotational axis, the rotor rotational axis being in a substantially collinear relationship relative to the shaft axis, the rotor being rotatable about the rotor rotational axis. Typically, the rotor side surfaces are configured to reduce aerodynamical drag thereon when the rotor is rotated about the rotor rotational axis.

Conveniently, the engine further comprises a vacuum creating means fluidly coupled to the engine for creating at least a partial vacuum substantially adjacent at least a portion of at least one of the rotor side surfaces.

Typically, the centrifugal force compensating means includes a reinforcement wall, the reinforcement wall having a substantially annular-shaped configuration, the reinforcement wall being configured and sized so as to be positioned radially outwardly relative to the thruster and in abutting contact with the latter about a reinforcement wall-to-thruster interface.

In accordance with the present invention, there is also provided a rotary engine for producing an output power about an output shaft using a combustible fluid, the output shaft extending substantially along a shaft axis, the engine comprising: a casing having a substantially cylindrical casing inner wall; a substantially cylindrical thruster base defining a thruster base axis, the thruster base axis extending in a substantially collinear relationship relative to the shaft axis, the thruster base being disposed for rotary motion relative to the casing inner wall in a rotary plane substantially perpendicular to the thruster base axis, the thruster base defining a radially outwardly located thruster base outer surface and an opposed radially inwardly located thruster base inner surface, the thruster base extending between a circumferential thruster base intake peripheral edge and an axially opposed circumferential thruster base exhaust peripheral edge; the thruster base and the casing inner wall being in a substantially concentric relationship relative to each other so as to define a casing inner wall-to-thruster base radial spacing therebetween; at least one pair of flow guiding blades extending from the thruster base towards the casing inner wall, the flow guiding blades being configured, sized and spaced relative to each other so as to define together with portions of the thruster base and casing inner wall extending therebetween a ramjet thruster; a thruster-to-shaft coupling means for operatively coupling the ramjet thruster and the output shaft.

Typically, each of the flow guiding blades defines a radially outwardly located blade contacting edge in contact with the thruster base and a radially opposed blade spaced edge positioned in a radially inwardly spaced relationship relative to the thruster base; the blade spaced edge being spaced from the casing inner wall by a blade-to-inner wall running clearance.

Conveniently, the ramjet thruster includes an inlet aperture for receiving the combustible fluid, the inlet aperture leading flow-wise into a convergent inlet diffuser having a flow-wise decreasing effective diffuser cross-sectional area, the inlet diffuser leading flow-wise into a combustion chamber, the combustion chamber leading flow-wise into a divergent exhaust nozzle having a flow-wise increasing effective diffuser cross-sectional area and the exhaust nozzle leading flow-wise to an exhaust aperture; the inlet diffuser being provided with a bleeding means for bleeding a bleedable portion of the combustible fluid from the inlet diffuser.

Typically, the inlet diffuser is an internal perforated diffuser, the bleeding means including bleeding apertures extending through the thruster base in the region of the inlet diffuser, the bleeding apertures being configured, positioned and sized for allowing an outflow volume of bleedable fluid therethrough, the outflow volume of bleedable fluid being inversely commensurable with the speed of flow of the combustible fluid in the inlet diffuser.

Conveniently, each of the ramjet thrusters defines a corresponding ramjet channel extending therethrough, the ramjet channel being generally angled relative to the tangential direction towards the radial direction; the ramjet channel having substantially the configuration of the mirror image of a substantially deployed "S" shape wherein the "S" shape is substantially deployed substantially along the tangential direction.

Typically, each of the ramjet thrusters allows exhaust therefrom of combustion products resulting from the combustion of the combustible fluid; each of the ramjet thruster including an inlet aperture for receiving the combustible fluid, the inlet aperture leading flow-wise into a convergent inlet diffuser having a flow-wise decreasing effective diffuser cross-sectional area, the inlet diffuser leading flow-wise into a combustion chamber, the combustion chamber leading flow-wise into a divergent exhaust nozzle having a flow-wise increasing effective nozzle cross-sectional area and the exhaust nozzle leading flow-wise to an exhaust aperture.

Conveniently, the inlet diffuser defines a substantially rectilinear extrados and a substantially concave intrados both merging towards each other for forming a diffuser throat; the exhaust nozzle defining a substantially rectilinear intrados and an opposed substantially concave extrados, both emanating from a nozzle throat, the combustion chamber having a substantially biconcave configuration between the diffuser and nozzle throat; the extrados of the inlet diffuser being angled from the tangential direction towards the radial direction by an inlet extrados angle; the intrados of the exhaust nozzle being angled from the tangential direction towards the radial direction by an exhaust intrados angle; whereby the combustible fluid penetrates into each of the ramjet thrusters with an average flow direction substantially parallel to the extrados of the inlet diffuser and the combustion products are ejected from each of the thrusters with an average flow direction substantially parallel to the intrados of the exhaust nozzle, the substantially concave intrados and extrados respectively of the inlet diffuser and exhaust nozzle being respectively adapted to act as compression and expansion ramps for respectively decelerating and accelerating the fluids flowing adjacent thereto.

Advantages of the present invention include that the proposed rotary ramjet engine allows for the conversion of chemically stored energy into rotating chemical power with a relatively high specific power or power-weight or volume ratio. Also, the proposed engine not only allows for the generation of mechanical power but also for mechanical power storage independently or in combination with the mechanical power generation.

Also, in at least one embodiment of the invention, the thrusters are designed so as to be relatively compact lengthwise and positionable relative to one another so as to optimize the number of thrusters for a given thruster supporting diameter. This leads to an optimization of the power obtainable for a given engine diameter, again, in turn, leading to optimization of the power-to-weight or volume ratio.

In at least some embodiments of the invention, the engine in accordance with the present invention is also characterized by its adaptability to various types of fuels including conventional hydrocarbon based fuels and hydrogen. Some of the combustible material usable by the proposed engine allows the latter to maintain relatively high specific power output while reducing the generation of undesirable products of combustion such as nitrogen oxide or the like or incomplete products of combustion such as carbon monoxide or the like. The proposed engine is hence usable in various settings, particularly in locales having strict environmental regulations, Still further, the proposed engine is designed so as to reduce the risks of breakdown in order to reduce the overall operational costs and to allow for its usage on equipment where reliability of operation is important. Generally, the proposed engine allows for the generation of power to be done in a simple and direct manner. In at least one embodiment, the proposed engine is designed so as to have a minimal number of moving parts and so as to avoid complex sub-systems. The rotating components of the proposed device are designed so as to be able to withstand the stresses and strains of rotating at relatively high tip speeds.

In at least one embodiment of the invention, the proposed engine is designed so that the centrifugal force imparted on its torque creating components by the rotation of the latter is compensated or counter-balanced by a toroidal or ring-shaped reinforcement component specifically designed to efficiently withstand relatively high stresses particularly when the latter are oriented in a predetermined direction. By using a radially outwardly located reinforcement wall, the usually larger rotating component used for transmitting the torque to the output shaft may be greatly reduced in size and weight.

The reduction in weight of the conventionally more massive rotational components, mainly the rotor, leads to a substantial decrease of the overall engine mass and, hence, to a substantially improved specific power. The reduction in weight of the larger components such as the rotor, in turn, lead to a reduction in the size and weight of other components required for supporting the rotor such as the frame, the bearings and the like.

In at least one embodiment of the invention, the rotor of the proposed engine is specifically configured to reduce parasitic aerodynamical drag thereon. Also, in at least one embodiment of the invention, the proposed engine is further provided with vacuum creating means for creating at least a partial vacuum at strategic locations in order to further reduce aerodynamical drag on its rotating components.

In at least one embodiment of the invention, the proposed engine is provided with cooling means for cooling some of its potentially heat sensitive components, allowing the latter to be used in relatively high temperature environments.

Still furthermore, in at least one embodiment of the invention, the proposed engine is provided with means for insuring a relatively smooth operation thereof even during operational start-up conditions. In at least one embodiment of the invention, a perforated internal diffuser is used to allow for bleeding in inverse proportionality to the rotational speed during initial rotational acceleration.

Furthermore in accordance with at least one embodiment of the invention, the thruster configuration is such that the cowling-blade interface is positioned on the interior surface of the blade as opposed to the conventional exterior wall positioning used with conventional turbo machines. The pressure on the inner wall being lower than on the external wall, efficiency losses may be reduced compared to conventional gas turbines.

Yet, still another advantage of the present invention resides in that the design of some of its potentially critical components is such that rupture thereof during use may be less catastrophic than the rupture of conventional equivalent components.

Other features and additional advantages of the present invention may become apparent to those skilled in the art from the foregoing and from the detailed description which follows and the appended claims, in conjunction with the accompanying drawings.

Other objects, advantages and features of the present invention will become more apparent upon reading of the following non-restrictive description of preferred embodiments thereof, given by way of example only with reference to the accompanying drawings.

BRIEF DESCRIPTION OF THE DRAWINGS

In the appended drawings:

An embodiment of the present invention will now be disclosed, by way of example, in reference to the following drawings, in which:

FIG. 13, in a left side view of FIG. 10, illustrates some of the features of ramjet thrusters, part of a rotary ramjet engine in accordance with an embodiment of the present invention;

FIG. 14, in a right side view of FIG. 10, illustrates some of the features of ramjet thrusters, part of a rotary ramjet engine in accordance with an embodiment of the present invention;

FIG. 15, in a partial schematic view, illustrates the configuration and positioning of shock waves generated in a thruster, part of a rotary ramjet engine in accordance with an embodiment of the present invention at a speed of 1.95 Mach;

FIG. 16, in a detailed view taken along arrows 16-16 of FIG. 15, illustrates in greater detail, the configuration and positioning shown in FIG. 15;

FIG. 17, in a partial schematic view, illustrates the configuration and positioning of shock waves within the thruster, part of a rotary ramjet engine in accordance with an embodiment of the present invention at a speed of 2.5 Mach;

FIG. 18, in a detailed view taken along arrows 18-18 of FIG. 17, illustrates in greater detail the positioning and configuration of the shock waves shown in FIG. 17;

DETAILED DESCRIPTION

Figure 1:
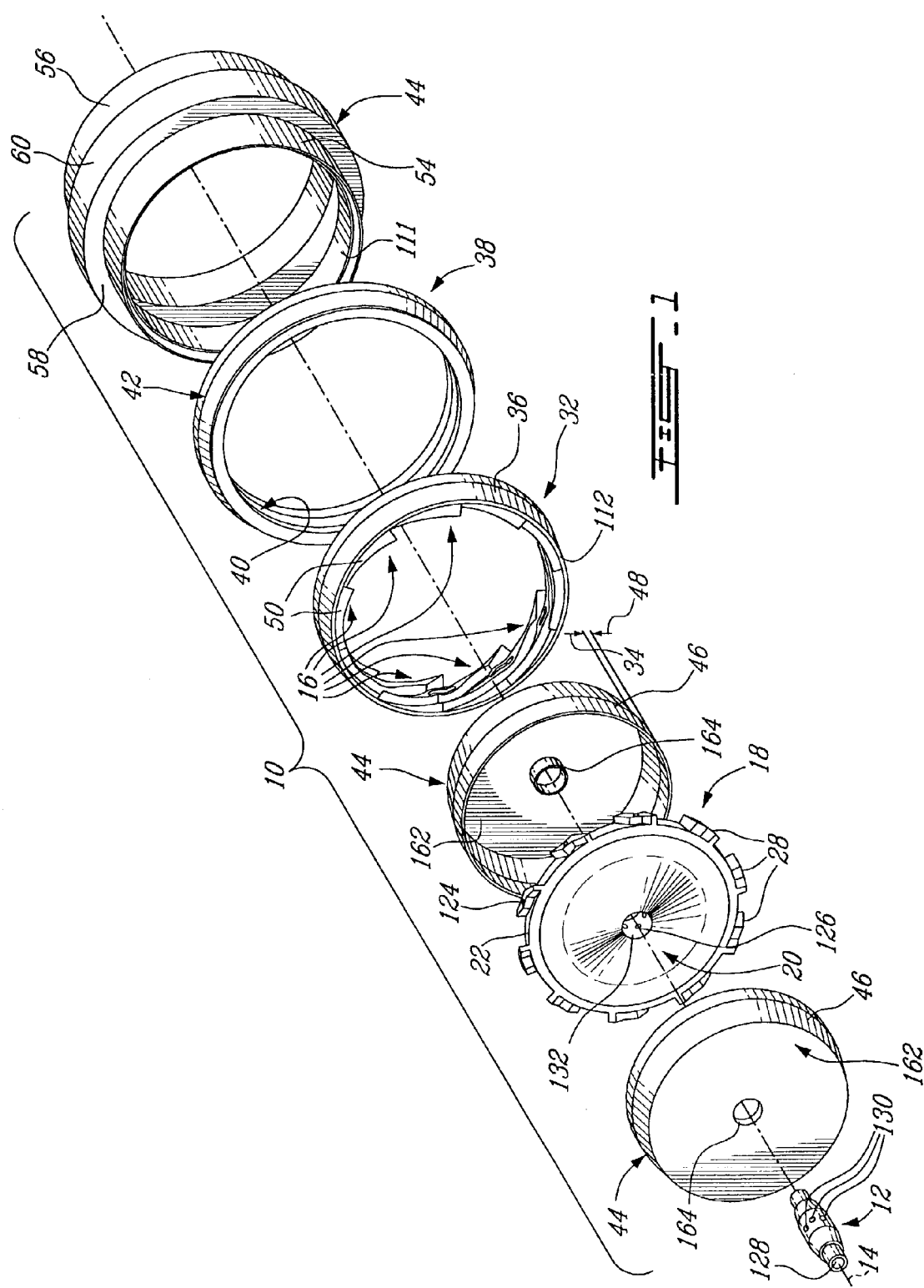
FIG. 1, in an exploded view, illustrates some of the components of a rotary ramjet engine in accordance with an embodiment of the present invention.

Referring to FIG. 1, there is shown, in an exploded view, some of the components of a rotary ramjet engine 10 in accordance with an embodiment of the present invention. The engine 10 is intended to be used for producing an output power about an output shaft 12. The output shaft 12 extends substantially along a shaft axis 14 and is mounted so as to be rotatable about the latter.

The engine 10 includes at least one, and preferably a plurality of thrusters 16. The thrusters 16 shown throughout the Figures are of the ramjet type. It should, however, be understood that any suitable type of thruster could be used without departing from at least one inventive concept of the present invention.

As illustrated in FIG. 1, the thrusters 16 are typically disposed substantially symmetrically relative to the shaft axis 14 for rotary motion along a common substantially circular thruster path positioned in a common rotary plane substantially perpendicular to the shaft axis 14. Each individual thruster 16 is capable of generating a corresponding thruster torque about the shaft axis 14. Also, as is well known in the art, the rotation of the thrusters 16 along the thruster path generates thereon a corresponding thruster centrifugal force.

The engine 10 also includes a thruster-to-shaft coupling means operatively coupled to both the thrusters 16 and the output shaft 12 for transmitting the respective thruster torques to the output shaft 12. The engine 10 further includes an independent centrifugal force compensating means operatively coupled to the thrusters 16 for reacting to the centrifugal force generated thereby and compensating for the centrifugal force so as to maintain the thrusters 16 in the thruster path when the thrusters 16 are rotated in the rotary plane.

In at least one embodiment of the invention, the thruster-to-shaft coupling means and the centrifugal force compensating means are allowed to perform their respective torque transmitting and centrifugal force compensating functions substantially independently from each other so as to substantially reduce the need for the thruster-to-shaft coupling means to react and to compensate for the centrifugal force.

The thruster-to-shaft coupling means may take any suitable form including non-mechanical coupling such as magnetic, electric or electromagnetic coupling (not shown) or the like without departing from the scope of the present invention. When a mechanical coupling component is used, various types of configurations such as spokes (not shown) or the like may be used without departing from the scope of the present invention. Typically, the thruster-to-shaft coupling means includes a generally disc-shaped rotor 18.

Regardless of the type of mechanical coupling component used, the mechanical coupling component typically defines a radially innermost located coupling component inner edge and a radially outermost located coupling component outer edge. Typically, a coupling component-to-thruster attachment means is used for attaching the mechanical coupling component to the thruster 16. Similarly, a coupling component-to-shaft attachment means is typically used for attaching the coupling component to the output shaft 12. Again, it should be understood that various types of coupling component-to-thruster and shaft attachment means, including structural, adhesive, magnetic, electric, electromagnetic and other means could be used without departing from the scope of the present invention.

When a mechanical coupling component is used, the latter is typically configured and sized for extending substantially radially between the output shaft 12 and at least one of the thrusters 16. In such instances, a coupling component-to-thruster attachment means is provided for attaching the mechanical coupling component to the at least one thruster 16 and a coupling component-to-shaft attachment means is also provided for attaching the coupling component to the output shaft 12.

When a generally disc-shaped rotor 18 is used, the rotor 18 defines a pair of opposed rotor side surfaces 20 (only one of which is shown in FIG. 1) and a radially outermost rotor peripheral surface 22. The rotor 18 further defines a rotor rotational axis extending in a substantially co-linear relationship relative to the shaft axis 14.

The rotor side surfaces 20 are typically configured to reduce aerodynamical drag thereon when the rotor 18 is rotated about the rotor rotational axis. In one possible embodiment of the invention shown more specifically in FIGS. 2 and 4, the cross-sectional configuration of the rotor 18 is dividable into a pair of rotor cross-section half portions 25 substantially symmetrically configured and positioned relative to the rotor rotational axis. Each one of the rotor cross-section half portions 25 defines a half portion proximal region 24 and an integrally extending half portion distal region 26 located respectively radially, proximally and distally relative to the rotor rotational axis.

Typically, although by no means exclusively, the half portion proximal region 24 has a substantially frusto-triangular configuration tapering radially outwardly while the half portion distal region 26 has a substantially rectangular configuration. The illustrated rotor configuration not only reduces parasitic drag on the rotor 18 during use but also facilitates dimensionning of the rotor 18 at different dimensional scales without the need for complex calculations.

Figure 4:
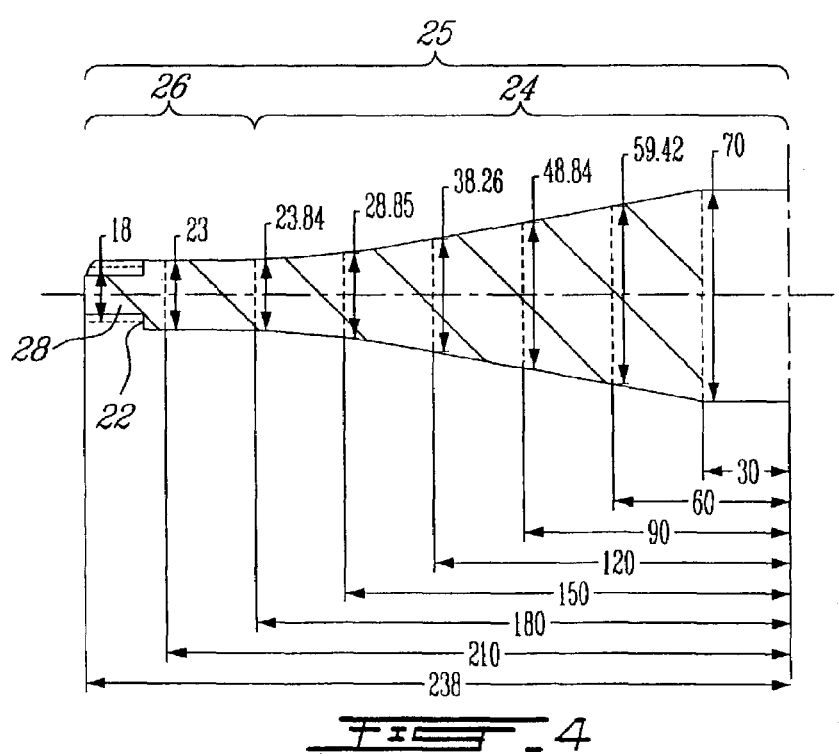
FIG. 4, in a partial axially transversal cross-sectional view, illustrates some of the dimensional characteristics of part of a rotor component incorporated in a rotary ramjet engine in accordance with an embodiment of the present invention.

FIG. 4 indicates, in millimeters, typical dimensional relationships between the axial thickness and radial position of a typical rotor half portion 25. It should, however be understood that these dimensional values are only given by way of example and that other dimensional values and rotor cross-sectional configurations could be used without departing from the scope of the present invention.

In order to further reduce aerodynamical drag on the rotor side surfaces 20, the engine 10 may be provided with a vacuum creating means (not shown) fluidly coupled to the engine 10 for creating at least a partial vacuum substantially adjacent at least a portion of at least one of the rotor side surfaces 20. Preferably, when a vacuum creating means is used, the vacuum creating means creates a vacuum substantially adjacent the substantially full area of both rotor side surfaces 20.

The thruster-to-shaft coupling means preferably allows the thrusters 16 and the mechanical coupling component to expand and retract radially substantially independently from each other. The thruster-to-shaft coupling means is hence typically designed so as to reduce or eliminate the stresses created by discrepancies between the centrifugal radial expansions of the at least one thruster 16 and the mechanical coupling component such as the rotor 18. Typically, the component-to-thruster attachment means allows the mechanical coupling component and the at least one thruster 16 to rotate solidarily with each other while allowing a relative radial movement between the coupling component outer edge and the at least one thruster 16.

Typically, although by no means exclusively, the coupling component-to-thruster attachment means includes an inter-engaging tongue and groove combination including at least one tongue 28 and at least one groove 30. The tongue and groove combination extends between the coupling component outer edge and the at least one thruster 16. The tongue 28 and the groove 30 are configured and sized for maintaining the tongue 28 in operational contact with the groove 30 while allowing relative movement between the tongue 28 and the groove 30 in a substantially radial direction and while preventing relative movement between the tongue 28 and the groove 30 in other directions.

In situations wherein a disc-shaped rotor 18 is used, at least one and preferably a plurality of tongues 28 extend integrally and substantially radially from the rotor peripheral surface 22. Correspondingly, at least one and preferably a plurality of grooves 30 are defined by the thrusters 16.

Figure 5:
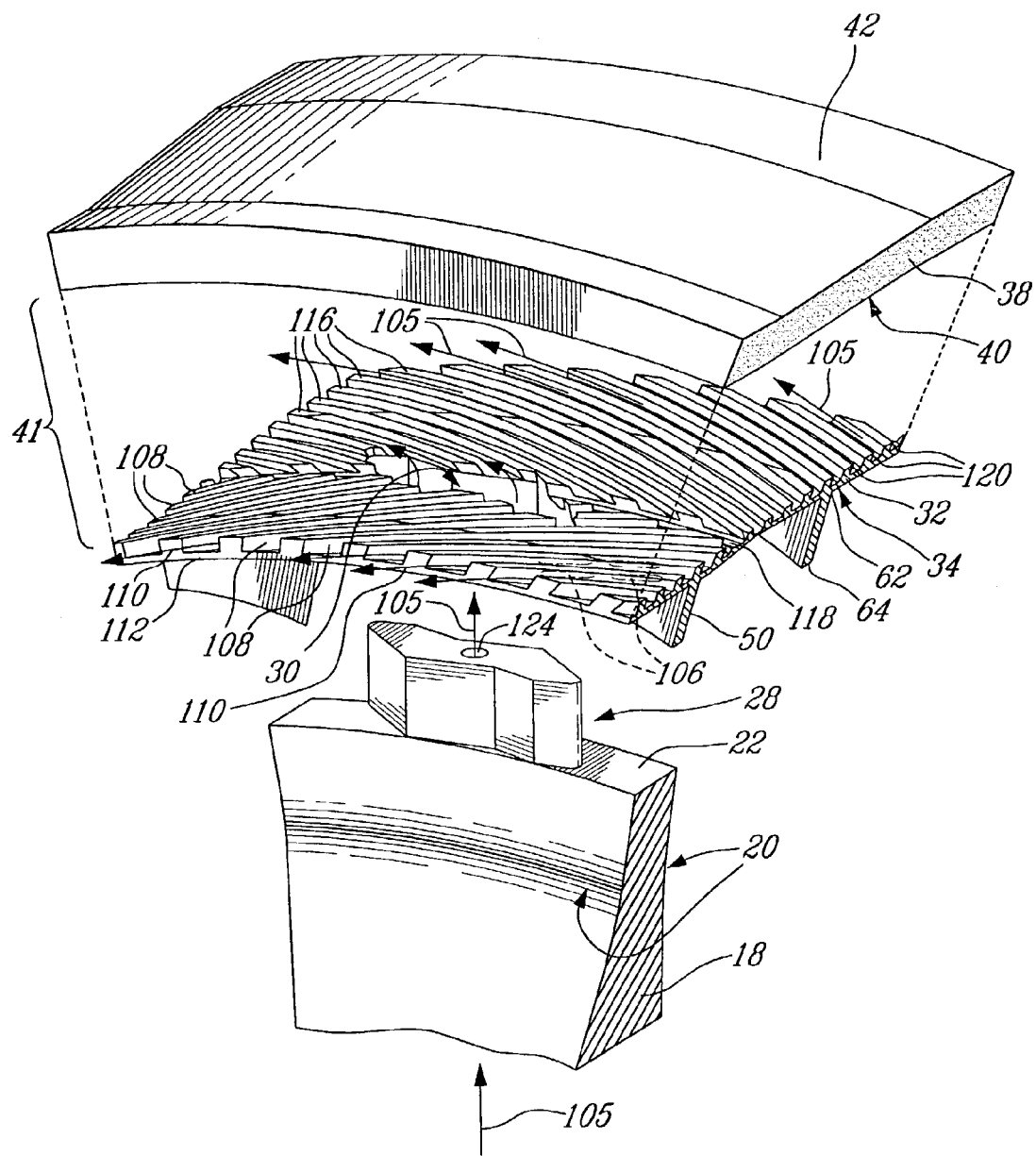
FIG. 5, in a partially exploded sectional view, illustrates some of the features of a rotor, thruster blades, a thruster base and a reinforcement wall, all part of a rotary ramjet engine in accordance with an embodiment of the present invention.
Figure 6:
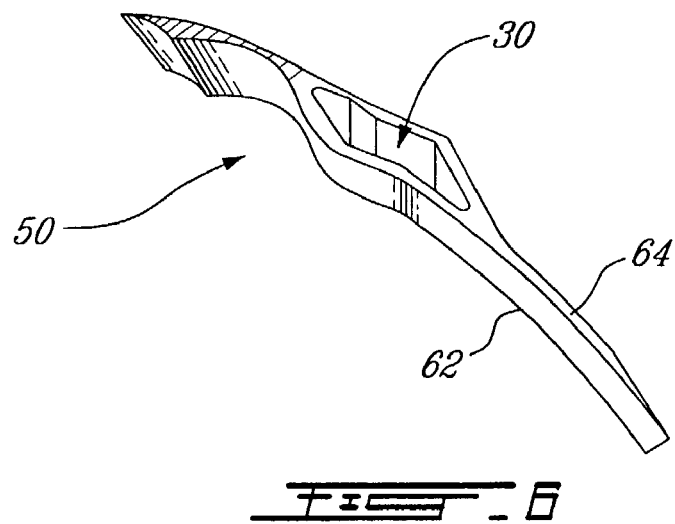
FIG. 6, in a perspective view, illustrates a flow guiding blade used for forming a thruster incorporated in a rotary ramjet engine in accordance with an embodiment of the present invention.
Figure 7:
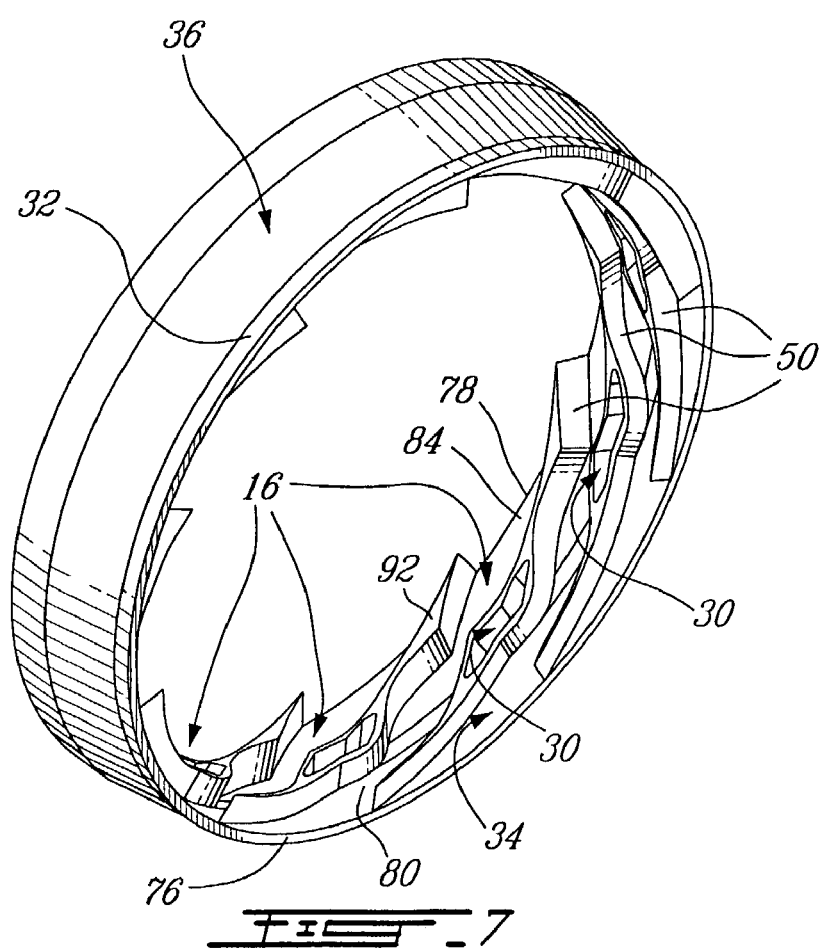
FIG. 7, in a perspective view, illustrates a set of flow guiding blades and a thruster base part of a rotary ramjet engine in accordance with an embodiment of the present invention.

As illustrated more specifically in FIGS. 5 through 7, each tongue 28 typically has a substantially parallelepiped-shaped tongue configuration while each corresponding groove 30 typically has a substantially complementary parallelepiped-shaped groove configuration. In at least one embodiment of the invention, the tongue and groove combination is provided with biasing means such as a spring component and dampening means such as a shock-absorbing component (both not shown) for ensuring the dynamic stability of the rotor 18.

In situations such as shown throughout the figures wherein more than one thruster 16 is used, the engine 10 further includes a thruster-to-thruster coupling means extending between adjacent thrusters 16 for mechanically coupling together the thrusters 16 and for maintaining the latter in a predetermined spaced relationship relative to each other. Typically, the thruster-to-thruster coupling means includes a substantially annular-shaped thruster base 32.

As shown more specifically in FIG. 7, the thruster base 32 defines a radially inwardly located thruster base inner surface 34 and an opposed radially outwardly located thruster base outer surface 36. The thrusters 16 typically extend substantially radially and inwardly from the thruster base inner surface 34.

As shown more specifically in FIGS. 1 through 3 and 5, the centrifugal force compensating means typically includes a reinforcement wall 38 having a substantially annular-shaped configuration. The reinforcement wall 38 is configured and sized so as to be positioned radially outwardly relative to the thruster base 32 and in abutting contact with the latter about a reinforcement wall-to-thruster interface 41.

As shown more specifically in FIGS. 5 and 10 through 14, the reinforcement wall 38 typically defines a radially inwardly located reinforcement wall inner surface 40 and an opposed radially outwardly located reinforcement wall outer surface 42. In situations wherein a plurality of thrusters 16 are coupled together by an annular thruster base 32, the reinforcement wall 38 is configured and sized so that at least a portion and preferably most or all of the reinforcement wall inner surface 40 contacts at least a portion and preferably most or all of the thruster base outer surface 36 or protrusions extending therefrom about a reinforcement wall-to-thruster base interface 41 indicated in FIG. 5.

When a mechanical coupling component such as a set of spokes (not shown) or a rotor 18 is used as thruster-to-shaft coupling means, the latter is typically made out of a carbon/carbon composite material coated at strategic locations with a substantially oxidation resistant coating for providing suitable mechanical characteristics in a high temperature and oxidizer rich operational environment. The oxidation resistant coating typically includes silicium carbide and tetra-ethyl-ortho-silicate. It should, however, be understood that the rotor 18 may be made out of any other suitable material and coated with any suitable coating without departing from the scope of the present invention.

The reinforcement wall 38 is typically made out of a one dimensional carbon-based composite material having its carbon fibers oriented in a predetermined direction. In one embodiment of the invention, the carbon-based composite material may include a matrix made out of epoxy. In another embodiment of the invention, the carbon-based composite material may include a matrix made out of polyimide.

Alternatively, the reinforcement wall 38 may be made out of monofilament carbon fibers or other high strength fibers windings without any linking matrix. The carbon fibers could be wound or coiled around any suitable structure such as external protrusions protruding from the external surface of the thrusters 16.

Figure 2:
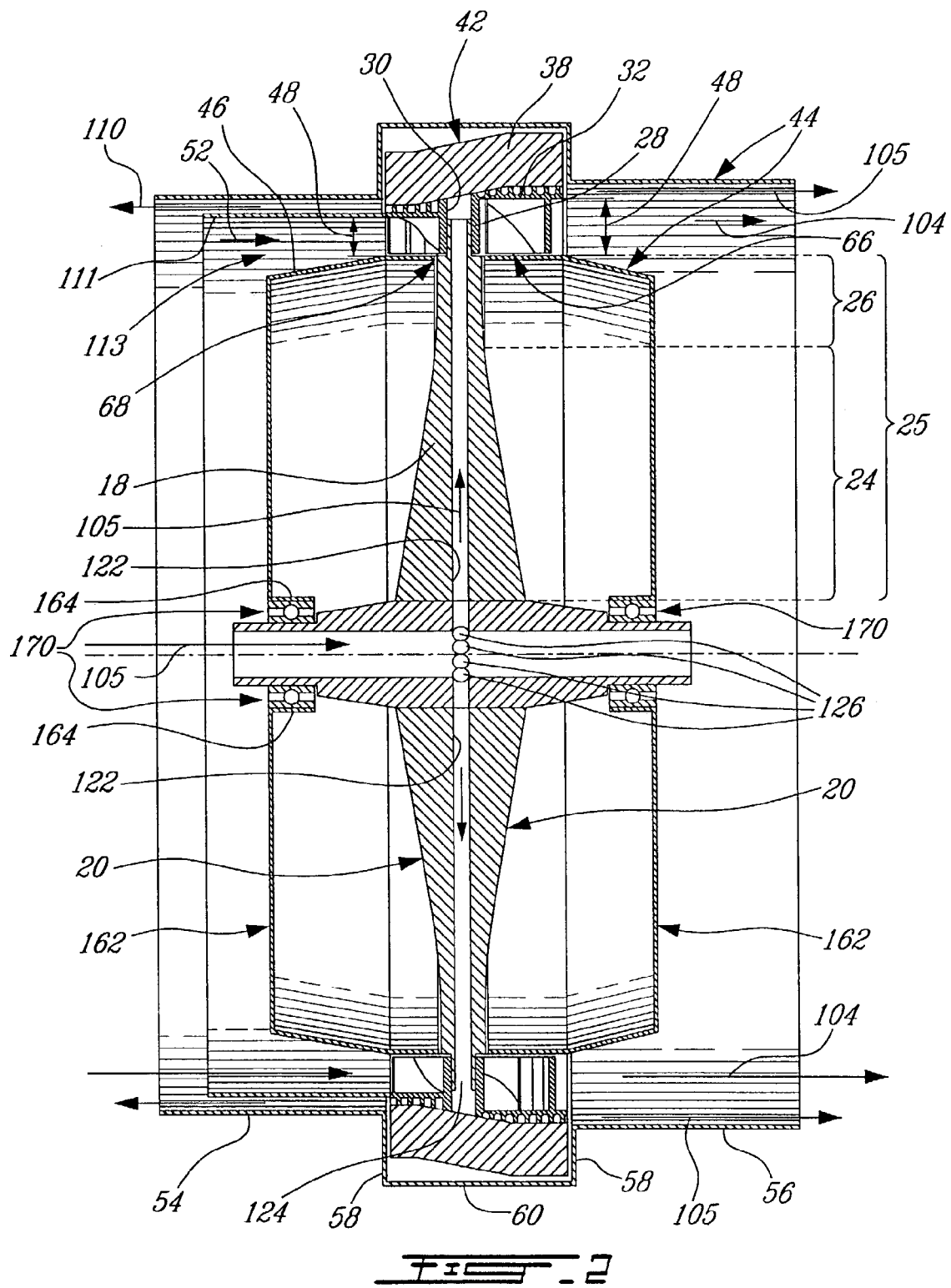
FIG. 2, in an axially transversal cross-sectional view, illustrates some of the components of a rotary ramjet engine in accordance with an embodiment of the present invention.
Figure 3:
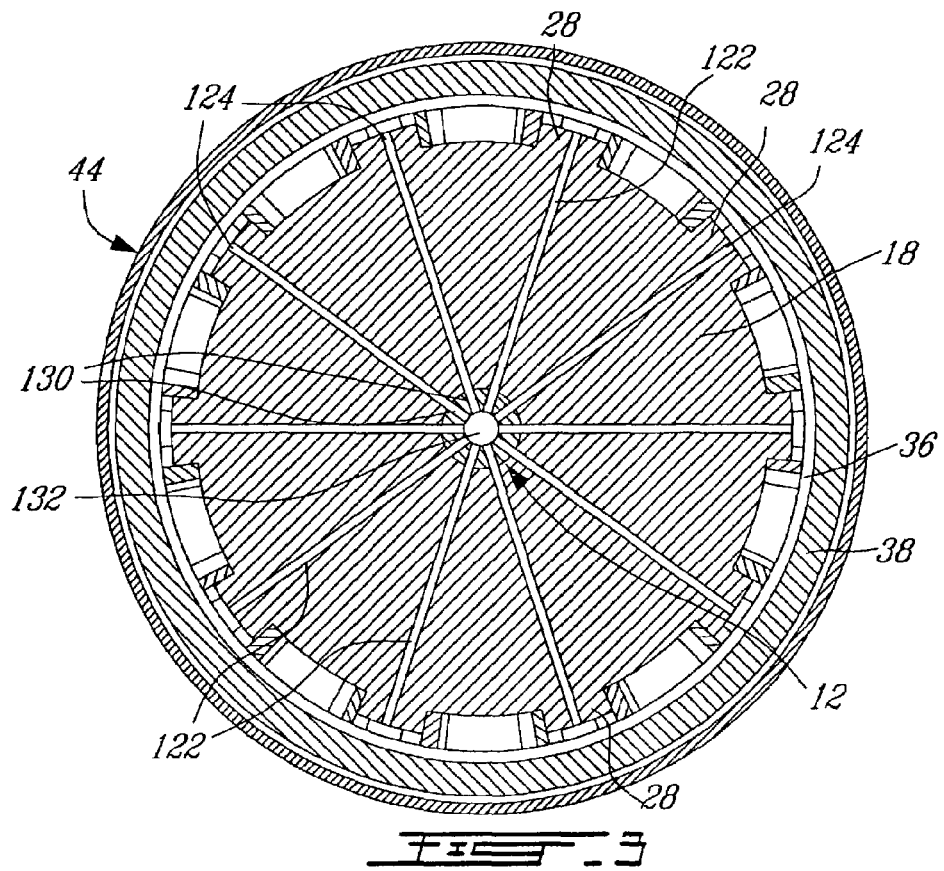
FIG. 3, in a radially transversal cross-sectional view, illustrates some of the components of the rotary ramjet engine shown in FIGS. 1 and 2.

As shown in FIGS. 1 and 2, the engine 10 typically further includes a casing 44. The casing 44 has a substantially cylindrical casing inner wall 46. Typically, the casing inner wall 46 includes two inner wall half sections extending substantially, axially and outwardly from a position located respectively on each side of the rotor 18 adjacent the rotor outer peripheral surface 22. As shown in FIG. 2, the thruster base 32 and the casing inner wall 46 are in a substantially concentric relationship relative to each other so as to define a casing inner wall-to-thruster base radial spacing 48 therebetween.

As illustrated more specifically in FIGS. 1, 5 and 7, at least one and preferably a plurality of pairs of flow guiding blades 50 extend from the thruster base 32 towards the casing inner wall 46. The flow guiding blades 50 are configured, sized and spaced relative to each other so as to define, together with portions of the thruster base inner surface 34 and the casing inner wall 46 extending therebetween, corresponding ramjet thrusters 16.

As shown more specifically in FIGS. 5 and 10 through 14, each of the flow guiding blades 50 defines a radially outwardly located blade contacting edge 62 in contact with the thruster base inner surface 34 and a radially opposed blade spaced edge 64 positioned in a radially inwardly spaced relationship relative to the thruster base inner surface 34.

As shown more specifically in FIG. 2, the blade spaced edge 64 is spaced from a corresponding casing inner wall 46 by a blade-to-inner wall running clearance 66. Similarly, each half section of the casing inner wall 46 is spaced from a corresponding adjacent rotor side surface 20 by an inner wall-to-rotor running clearance 68.

Figure 8:
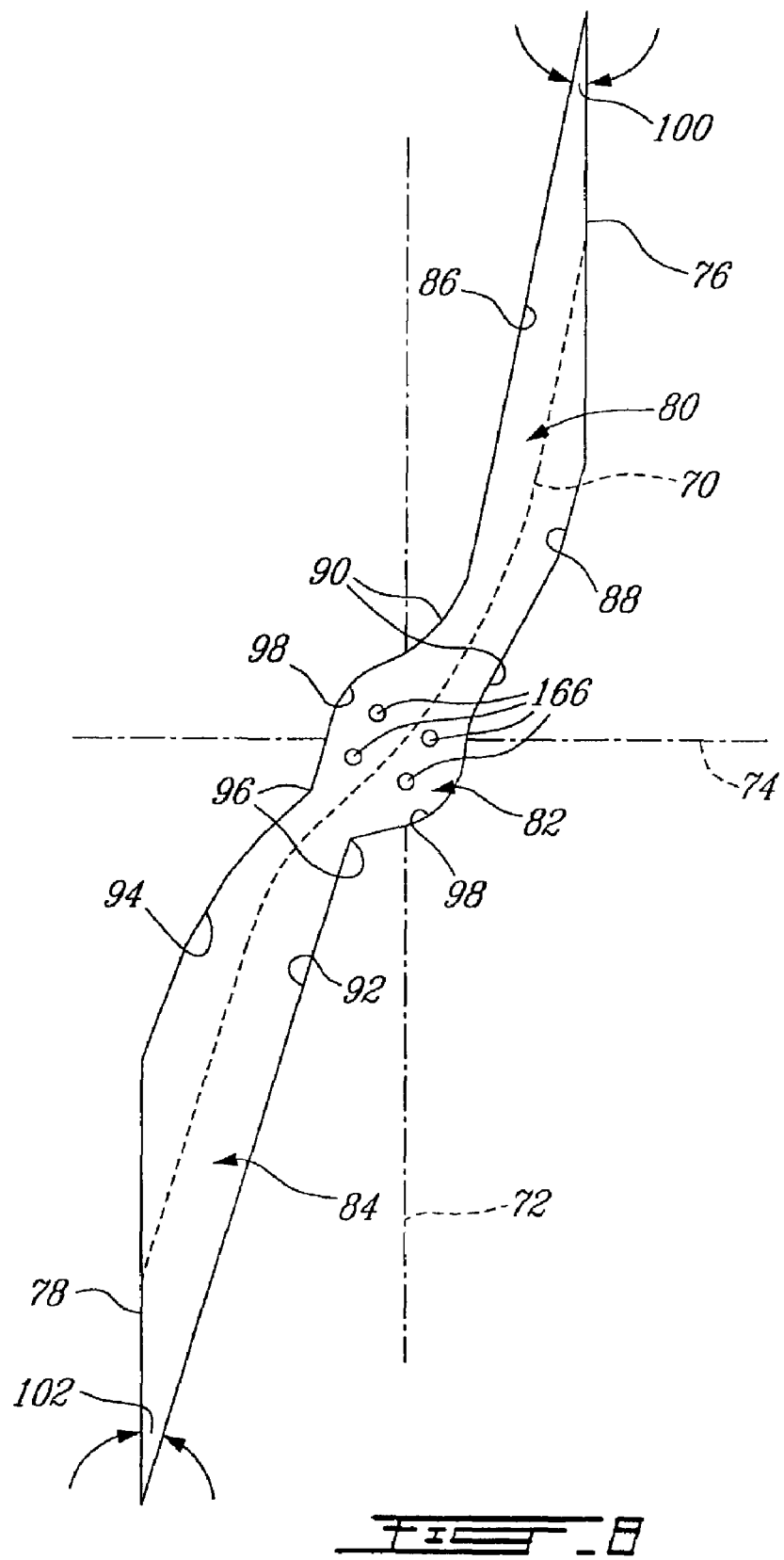
FIG. 8, in an elevational view, illustrates the deployed configuration of a flow duct formed by a ramjet thruster, part of a rotary ramjet engine in accordance with an embodiment of the present invention.
Figure 9:
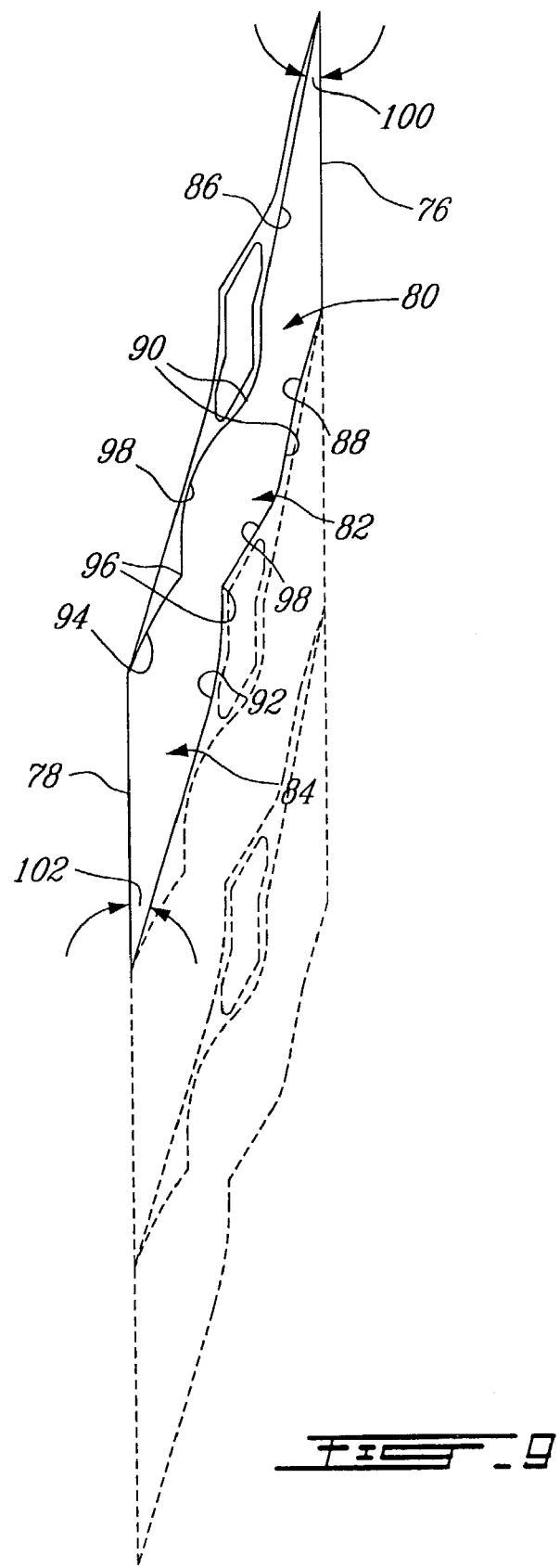
FIG. 9, in a partial elevational view, illustrates a set of three flow guiding blades positioned in an adjacent relationship relative to each other to define a corresponding set of flow ducts, part of corresponding ramjet thrusters incorporated in a rotary ramjet engine in accordance with an embodiment of the present invention.
Figure 10:
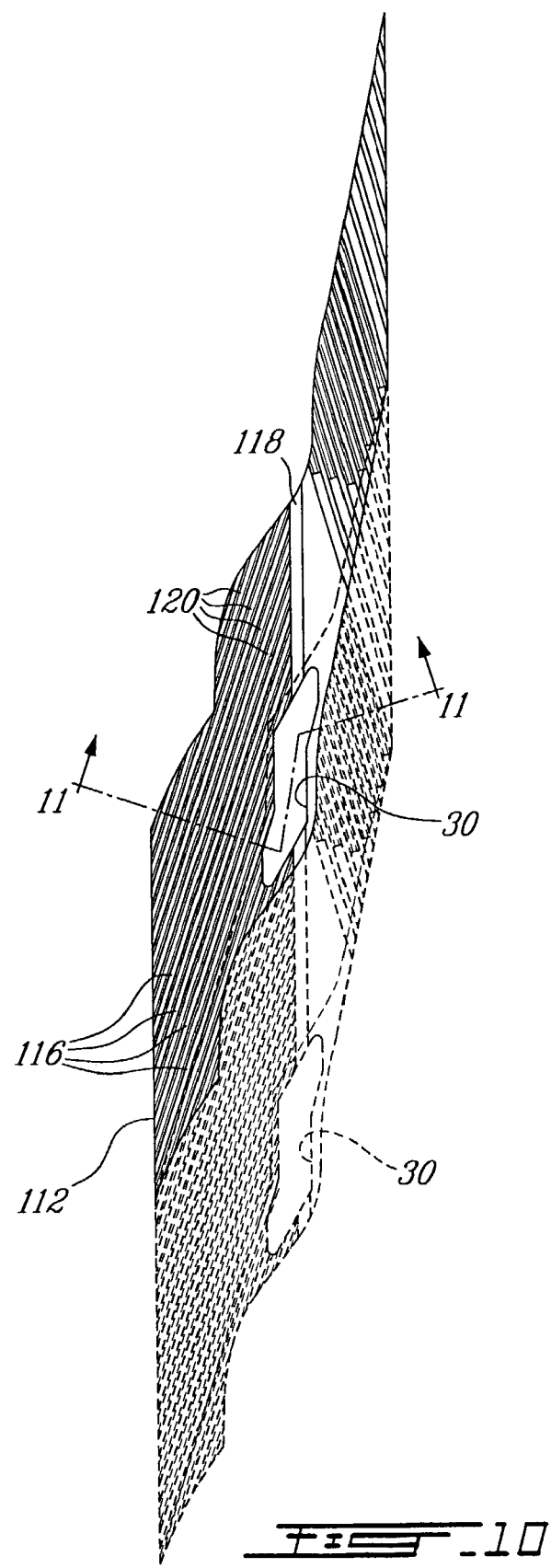
FIG. 10, in an elevational view, illustrates the deployed configuration of a pair of ramjet ducts formed partly by a corresponding pair of flow guiding blades, part of a rotary ramjet engine in accordance with an embodiment of the present invention.
Figure 11:
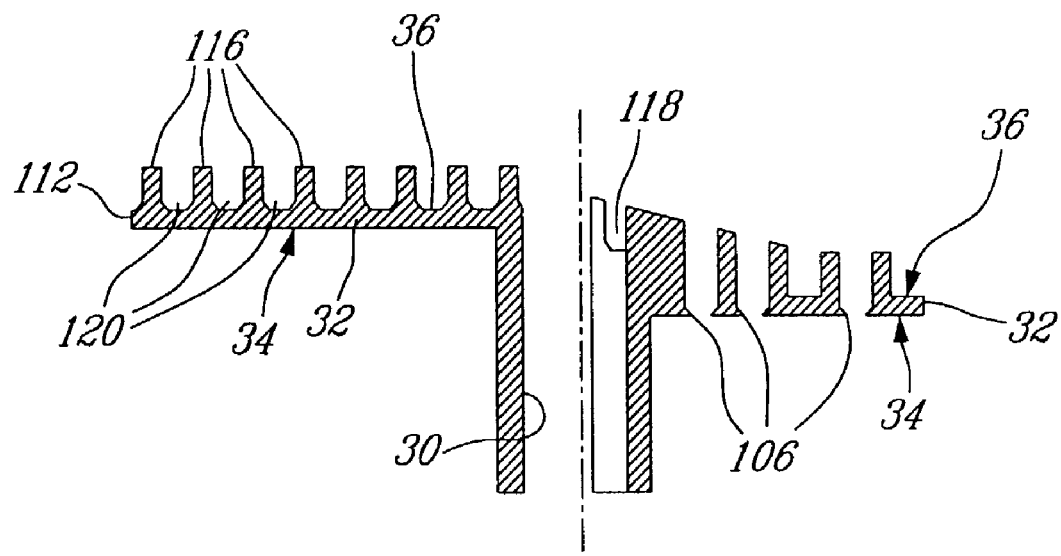
FIG. 11, in a cross-sectional view taken along arrows 11-11 of FIG. 10, illustrates the configuration of cooling and bleeding channels, part of ramjet thrusters incorporated in a rotary ramjet engine in accordance with an embodiment of the present invention.
Figure 12:
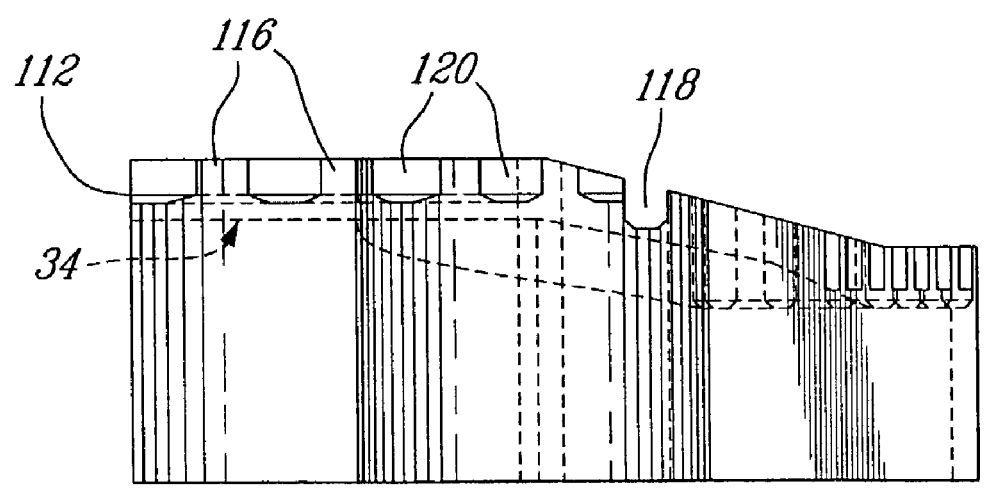
FIG. 12, in a top end view of FIG. 10, illustrates some of the features of ramjet thrusters, part of a rotary ramjet engine in accordance with an embodiment of the present invention.

Referring now more specifically to FIG. 8, there is shown a two-dimensional top view of a deployed ramjet channel formed by a ramjet 16. The reference numeral 70 is used to designate a schematic representation of an average or equivalent flow path of a fluid traveling through the ramjet channel. Each ramjet channel is generally angled relative to the tangential direction 72 towards the radial direction 74. Also, typically, each ramjet channel typically forms substantially the mirror image of a substantially deployed or stretched "S"-shaped configuration wherein the "S" shape is substantially deployed or stretched substantially along the tangential direction.

Each ramjet channel typically extends from an inlet aperture 76 for receiving a combustible fluid to an exhaust aperture 78 for exhausting combustion products resulting from the combustion of the combustible fluid. Typically, the combustible fluid is a mixture of air and a combustible gas such as hydrogen or the like. Typically, the mixture is formed prior to being drawn through the inlet aperture 76.

The inlet aperture 76 leads in a flow-wise direction into a convergent inlet diffuser 80 having a flow-wise decreasing effective diffuser cross-sectional area. The inlet diffuser 80 leads flow-wise into a combustion chamber 82. The combustion chamber 80 leads flow-wise into a divergent exhaust nozzle 84 having a flow-wise increasing effective nozzle cross-sectional area. The exhaust nozzle 84, in turn, leads flow-wise to the exhaust aperture 78.

Typically, each inlet diffuser 80 defines a substantially rectilinear extrados 86 (a negative pressure or suction surface) and an opposed substantially concave intrados 88 (a positive pressure surface). The diffuser extrados 86 and intrados 88 both merge towards each other for forming a diffuser throat 90.

Conversely, the exhaust nozzle 84 typically defines a substantially rectilinear intrados 92 and an opposed substantially concave exhaust nozzle extrados 94. The exhaust nozzle intrados and extrados 92, 94 both emanate from a nozzle throat 96.

The combustion chamber 82 typically has a generally lenticular configuration defined by a pair of substantially concave and opposed combustion surfaces 98 extending between the diffuser and nozzle throat 90, 96.

The extrados 86 of the inlet diffuser 90 is typically angled from the tangential direction 32 towards the radial direction 74 by an inlet extrados angle 100. Similarly, the intrados 92 of the exhaust nozzle 84 is typically angled from the tangential direction 72 towards the radial direction 74 by an exhaust intrados angle 102.

Typically, the inlet extrados angle 100 has a value of from about 8 to 20 degrees. Preferably, the inlet extrados angle has a value of approximately 12 degrees. Typically, the exhaust intrados angle 102 has a value of from about 8 to about 30 degrees. Preferably, the exhaust intrados angle 102 has a value of about 17.33 degrees.

Typically, the combustible fluid penetrates into each of the ramjet thrusters 16 with an average or equivalent flow path 70 substantially parallel to the extrados 86 of the inlet diffuser 80. Similarly, the combustion products are ejected from each of the thrusters with an average or equivalent flow path 70 substantially parallel to the intrados 92 of the exhaust nozzle 84. As is well-known in the art, the substantially concave intrados and extrados 88, 94 respectively of the inlet diffuser 80 and exhaust nozzle 84 are respectively adapted to act as compression and expansion ramps for respectively decelerating and accelerating the combustion fluid and combustion products flowing adjacent thereto.

FIGS. 15, 16 and 17, 18 schematically illustrate the shock and expansion pattern for two potentially limit inlet Mach numbers respectively of 1.95 and 2.5. The lower limit typically corresponds to the onset of the rotation startup and the upper limit to the typical maximum rotational velocity. It should be understood that the hereinabove mentioned upper and lower limit values are only given by way of example for a specific fluid mixture and that other values are compatible with the present invention without departing from its scope.

Referring back to FIG. 2, there is shown that the radial spacing 48 typically varies with axial position. The increase in the radial spacing 48 about the outlet nozzle 84 allows for the obtention of a suitable ratio between the effective area of the inlet diffuser throat 90 and the effective area of the exhaust surface 78. Typically, the ratio of the effective area of the diffuser throat to the effective area of the exhaust surface 78 is in the range of one half to allow for suitable flow characteristics. Also, as is well-known in the art, the combustion chamber 82 is typically provided with at least one and preferably a set of flame-holding protrusions 166 protruding from the thruster base inner surface 36.

In order to facilitate the flow in the inlet diffuser 80 during startup, the inlet diffuser 80 is typically provided with a bleeding means for bleeding a bleedable portion of the combustible fluid from the inlet diffuser 80. Typically, the bleedable portion includes gases left over by an external normal shock in the un-started mode. This, in turn, will facilitate the flow through the inlet diffuser 80 during startup at relatively low Mach numbers.

As illustrated in FIGS. 5 and 10 through 14, the inlet diffuser 80 is typically an internal perforated diffuser having bleeding apertures 106 extending through the thruster base 32. The bleeding apertures 106 are configured, positioned and sized for allowing an outflow volume of bleedable fluid 110 therethrough. The bleeding apertures 106 are typically configured, positioned and sized so that the outflow volume of bleedable fluid 110 is inversely commensurable with the speed of flow of the combustible fluid in the inlet diffuser 80.

Typically, the bleeding apertures 106 are chamfered. It should be understood that although the bleeding apertures 106 are shown as having a generally slot-like configuration, the bleeding apertures 106 could have other configurations such as a generally cylindrical configuration without departing from the scope of the present invention.

When the inlet diffuser 80 is idled, having an upstream normal shock, the flow through the inlet diffuser 80 is typically subsonic with a high pressure. In such a state, the bleeding apertures 106 bleed a relatively large quantity of fluid. Conversely, in steady state, when the normal shock is located just upstream relative to the diffuser throat 90, the bleeding apertures 106 bleed a relatively small portion of bleedable fluid.

Indeed, as is well known, the fluid flowing at supersonic speed adjacent the bleeding apertures must rotate in the latter in order to bleed therethrough. When the tangential speed at the surface of the bleeding apertures 106 is relatively high, the bleeding discharge is relatively inefficient, hence only allowing for the bleeding of a relatively low mass of bleeding fluid.

As illustrated more specifically in FIG. 5, bleeding flow driving ribs 108 typically extend substantially radially from the thruster base outer surface 36 substantially adjacent the bleeding apertures 106. The bleeding flow guiding ribs 108 are configured, sized and position for guiding the bleeding flow 110 towards a thruster base intake peripheral edge 112.

As shown more specifically in FIG. 2, the casing 44 typically also includes a substantially annular flow partitioning wall 111. The partitioning wall 111 is intended to separate the intake flow 113 of combustible fluid drawn towards the inlet apertures 76 from the outflow 110 of bleedable fluid flowing out of the bleeding flow guiding ribs 108. The flow partitioning wall 111 typically extends substantially axially from a position located substantially adjacent the thruster base intake peripheral edge 112 to a position located substantially away from the inlet apertures 76.

When the reinforcement wall 38 is made of a composite material, for example, the engine 10 is preferably further provided with a temperature insulating means for thermically insulating the reinforcement wall 38 against the relatively higher temperatures generated adjacent the latter during use. The temperature insulating means make take any suitable form including layers of suitable insulating material (not shown).

In the embodiment shown throughout the figures, the temperature insulating means includes a cooling means for cooling the reinforcement wall 38 so as to maintain the structural characteristics of the composite material matrix despite the relatively higher temperatures generated adjacent the latter. Typically, the cooling means includes a thruster base cooling channel extending substantially radially through the thruster base 32 for allowing the pumping of a cooling fluid towards the thruster base outer surface 36.

Various types of pumping means may be used for pumping the cooling fluid towards the thruster base outer surface 36. In the embodiment shown throughout the figures, the thruster base cooling channel is configured and sized for allowing centrifugal pumping therethrough of the cooling fluid at a sufficient cooling fluid rate through the rotation of the thruster base 32.

As shown more specifically in FIGS. 5 and 10 through 14, the cooling means typically further includes cooling baffles 116 extending substantially radially from the thruster base outer surface 36. The cooling baffles 116 are configured so as to define outer surface cooling channels therebetween on the thruster base outer surface 36.

The outer surface cooling channels are configured so as to be in fluid communication with the thruster base cooling channel. The outer surface cooling channels typically include a substantially circumferential distributing channel 118 in communication with the thruster base cooling channel and a plurality of auxiliary channels 120 extending at an angle relative to the distributing channel 118 in fluid communication therewith.

Since the cooling baffles 116 typically abuttingly contact the reinforcement component inner surface 40, the pumping of a cooling fluid 105 at a suitable cooling fluid flow rate within the distributing and auxiliary channels 118, 120 allows for thermal insulation of the reinforcement component 38 from the substantially high temperatures generated in the ramjet thrusters 16 during use. The cooling fluid 105 may take any suitable form. Typically, the cooling fluid 105 includes ambient air pumped centrifugally during use from a location positioned radially inwardly relative to the ramjet thrusters 16.

As shown more specifically in FIG. 2, the cooling fluid 105 is typically discharged from the auxiliary channels 120 with an outflow velocity having at least partially an axially oriented component. Also, the auxiliary channels 120 typically discharge the cooling fluid 105 substantially adjacent the casing outlet peripheral wall 56. The flow of cooling fluid 105 adjacent the casing outlet peripheral wall 56 may hence be used to cool the latter and prevent overheating thereof by the exhaust flow 104 of the relatively hot products of combustion.

By way of example, in the embodiments shown in FIGS. 1 through 5, the engine further includes at least one, and preferably a plurality of rotor cooling channels 122 extending at least partially and typically fully therethrough. The rotor cooling channels 122 define a rotor cooling channel outlet end 124 for discharging the cooling fluid substantially adjacent the reinforcement component 38.

Typically, a rotor cooling channel 122 extends substantially radially through each tongue component 28 and has a corresponding rotor cooling channel outlet end 124 positioned adjacent the radially distal end of the corresponding tongue component 28. Each rotor cooling channel 122 also defines a rotor cooling channel inlet end 126 in fluid communication with the ambient air of the external environment typically adjacent the rotor rotational axis.

As illustrated in FIG. 1, the output shaft 12 may be provided with a shaft cooling channel 128 extending substantially longitudinally and at least partially therethrough. The shaft cooling channel 128 is in fluid communication with at least one and preferably a set of radially disposed shaft fluid discharge apertures 130.

Also, typically, the rotor 18 has a substantially centrally located shaft receiving aperture 132 extending therethrough. The shaft receiving aperture 132 is configured and sized for substantially fittingly receiving the output shaft 12. The rotor cooling channel inlet ends 126 lead into the shaft receiving aperture 132 and are positionable in fluid communication with the shaft fluid apertures 130.

Figure 21:
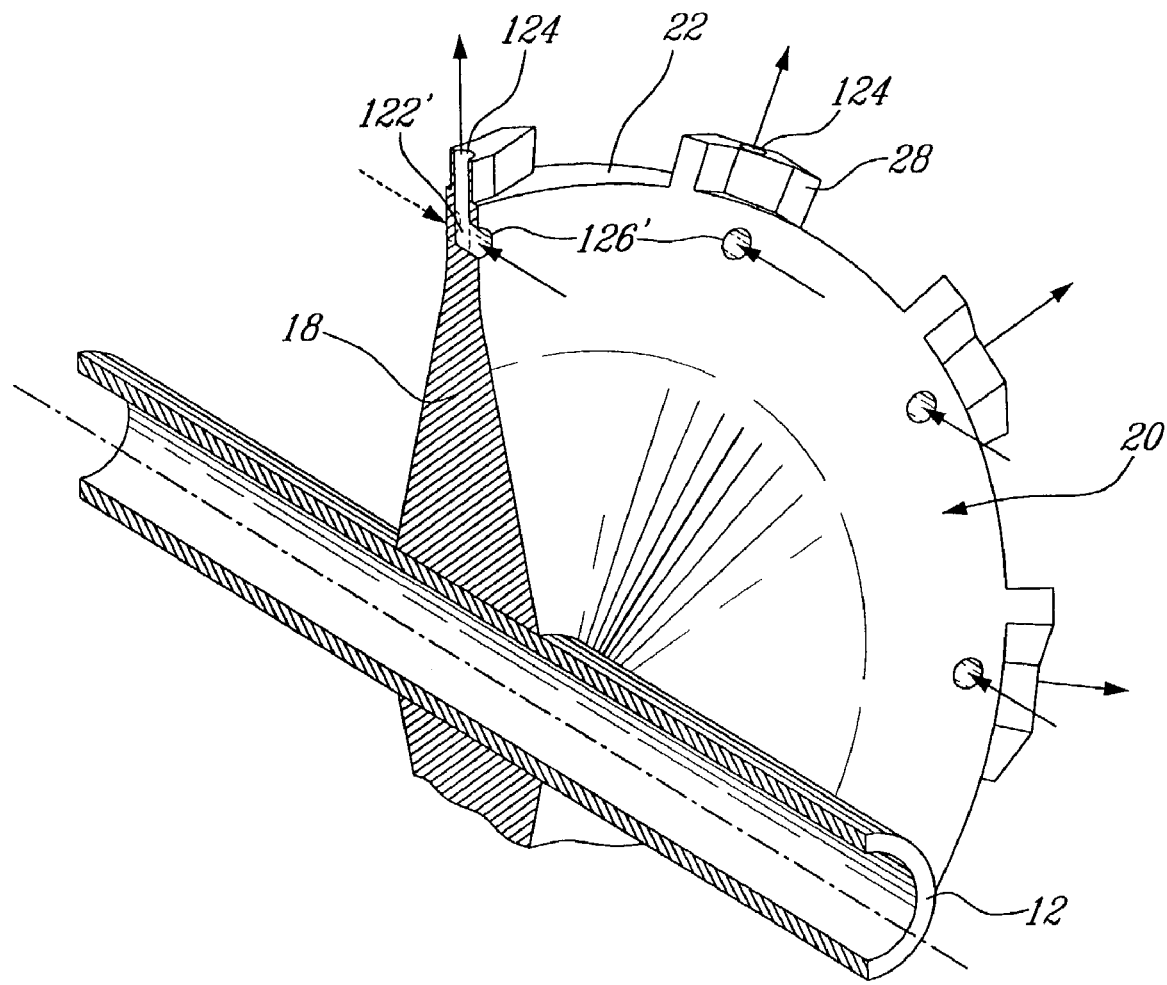
FIG. 21, in a partial perspective view with sections taken-out, illustrates a rotor component having cooling channels in accordance with an alternative embodiment of the invention.

Again, it should be understood that the rotor and shaft cooling channels 128, 132 are only illustrated by way of example since it is expected that such rotor and shaft cooling channels 128, 132 could create relatively high stress concentrations. Alternatively, as illustrated in FIG. 21, the rotor cooling channel 122' extends only partially radially through the rotor 18 and a rotor cooling channel inlet end 126' is positioned on either one or both of the rotor side surfaces substantially adjacent the rotor peripheral surface 22. When a pair of rotor cooling channel inlet ends 126' are positioned on both of the rotor side surfaces 20 they may be symmetrically or asymmetrically disposed relative to each other.

As illustrated in FIG. 2, the output shaft 12 is typically rotatably mounted to the casing 44 using bearings 160 supported by a pair of supporting flanges 164 extending from a corresponding pair of casing radial walls 162. The bearing-to-casing interface is also typically used for reacting to the axial thrust generated by the thrusters 16. It should be understood that other type of shaft supporting means for rotatably supporting the output shaft 12 could be used without departing from the scope of the present invention.

In operation, at start-up, the rotation of the rotating components is initiated through the use of an external driving means (not shown). As shown more specifically in FIG. 2, the inlet fluid schematically illustrated by arrows 113 is supplied to a circumferential inlet fluid supply plenum 52 formed by a substantially annular casing outer wall 54.

The inlet fluid 113 is drawn from the casing inlet fluid supply plenum 52 towards the ramjet inlet aperture 76. It should be noted that the inlet extrados 86 is angled by the inlet surface angle 100 relative to both the tangential and axial axes 72, 74. The inlet fluid 113 penetrates through inlet aperture 76 in a substantially parallel relationship relative to the inlet extrados 86 and, hence, with both axial and tangential inlet fluid velocities. The rotational speed of the thruster 16 relative to the adjacent static surfaces is such that the tangential inlet velocity is typically supersonic.

The supersonic ramjet inlet uses the kinetic energy inherent in the inlet fluid mass due to the relative velocity between the ramjet inlet and the supplied combustible fluid to compress the latter typically via oblique shock waves illustrated, by way of example, at two different speeds of Mach 1.95 and 2.5 respectively in FIGS. 15, 16 and 17, 18. As the combustible fuel passes through the shock waves, it is subjected to a thermal shock sufficient to initiate combustion thereof.

Depending on the type of combustible fuel used, ignition could also be assisted or performed with an ignition means (not shown) such as electrical ignition means or the like mounted on a suitable location such as on the engine housing 44 or on the rotor 18. Typically, the inlet diffuser is configured and sized so that when the inlet mixture reaches the combustion chamber 82, the flow has decelerated to a subsonic flow speed.

FIGS. 15 and 16 illustrate an example of the configuration of the oblique shock waves within the inlet diffuser 80 at a flow speed of Mach=1.95. The reference numeral 134 and 136 are used to designate lines of limit flow being expanded prior to the equivalent shock wave. The reference numeral 138 is used to indicate the line of typical flow. The reference numerals 140, 142 and 144 are used to indicate respectively first, second and third shock waves having corresponding angles of 33.4, 35.5 and 48.7 degrees. The reference numeral 146 is used to indicate an equivalent shock wave used for design purposes extending at an angle of 51.3 degrees.

Similarly, FIGS. 17 and 18 illustrate an example of the configuration and distribution of shock waves at a flow speed Mach number of 2.5 in the inlet diffuser 80. Similar reference numerals identified with a prime are used to denote similar flow lines and shock waves. The angles of the first, second, third and equivalent shock waves are respectively 25.8, 27.2, 37.0 and 40.4 degrees.

In steady state mode, the position of the normal shock is stabilized at the throat 96 or slightly upstream and has a value of substantially Mach=1 or slightly higher. The products of combustion after discharge from the combustion chamber 82 are expanded in the exhaust nozzle 84 and exhausted through the exhaust aperture 78 still containing tangential kinetic energy hence resulting in the rotational thrust of the rotor 18. The tangential thrust of the thrusters 16 is transmitted to the output shaft 12 by the rotor 18 while the centrifugal force created by the rotation of the thrusters 16 and rotor 18 is compensated by the reinforcement wall 38. Typically, the speed at the exhaust aperture is in the range of Mach=2.15.

The products of combustion after discharge through the exhaust aperture 78 are guided axially away from the engine 10 by an annular casing outlet peripheral wall 56 as indicated by arrow 104 in FIG. 2. The axial thrust of the thrusters 16 is transmitted to the bearings 160. A casing annular bulge extending circumferentially and having a substantially "U"-shaped cross-sectional configuration is provided for protectively housing the reinforcement wall 38.

The casing annular bulge typically includes a pair of bulge side walls 58 extending substantially radially outwardly from the casing inlet and outlet outer walls 54, 56 and a bulge peripheral wall 60 extending substantially radially between the distal ends of the bulge side walls 58. Although the configuration of the casing 44 shown throughout the figures is substantially compact so as to favour a high power-to-volume ratio, it should be understood that other casing configurations could be used without departing from the scope of the present invention.

Also, it should be understood that the hereinabove mentioned values with regards to shock waves and speeds are only given by way of example and that any suitable number of shock waves having any suitable value including an isentropic state free of shock waves as well as other suitable flow and moving parts speed could be used or result from the present invention without departing from its scope.

Figure 19:
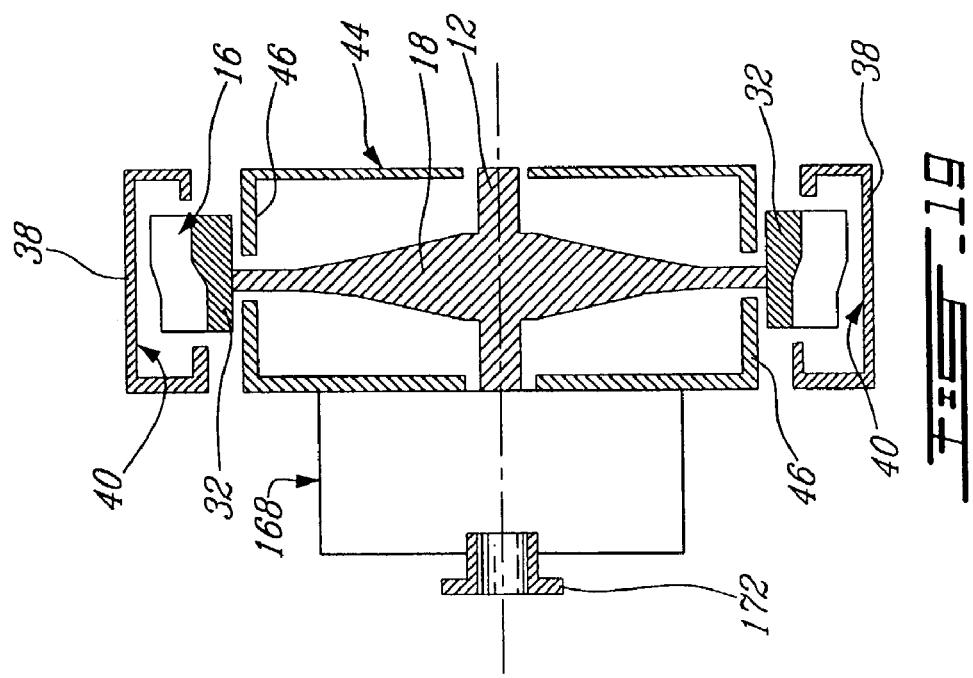
FIG. 19, in a schematic axially transverse cross-sectional view, illustrates the relationship between some of the components of a rotary ramjet engine in accordance with an embodiment of the present invention.

As shown schematically in FIG. 19, the output shaft 12 may optionally be coupled to a driven shaft 172 through a gear mechanism 168 or any other suitable means.

As mentioned previously, the fuel and combustion air may be premixed prior to feed to the ramjet inlet aperture 76. For example, fuel injectors (not shown) may add the fuel to an inlet fluid which may be a fuel free oxidant containing steam or which may contain some high value fuels such as hydrogen or some low value fuels such as biomass-produced fuel gas, sub quality natural gas, methane or the like.

Figure 20:
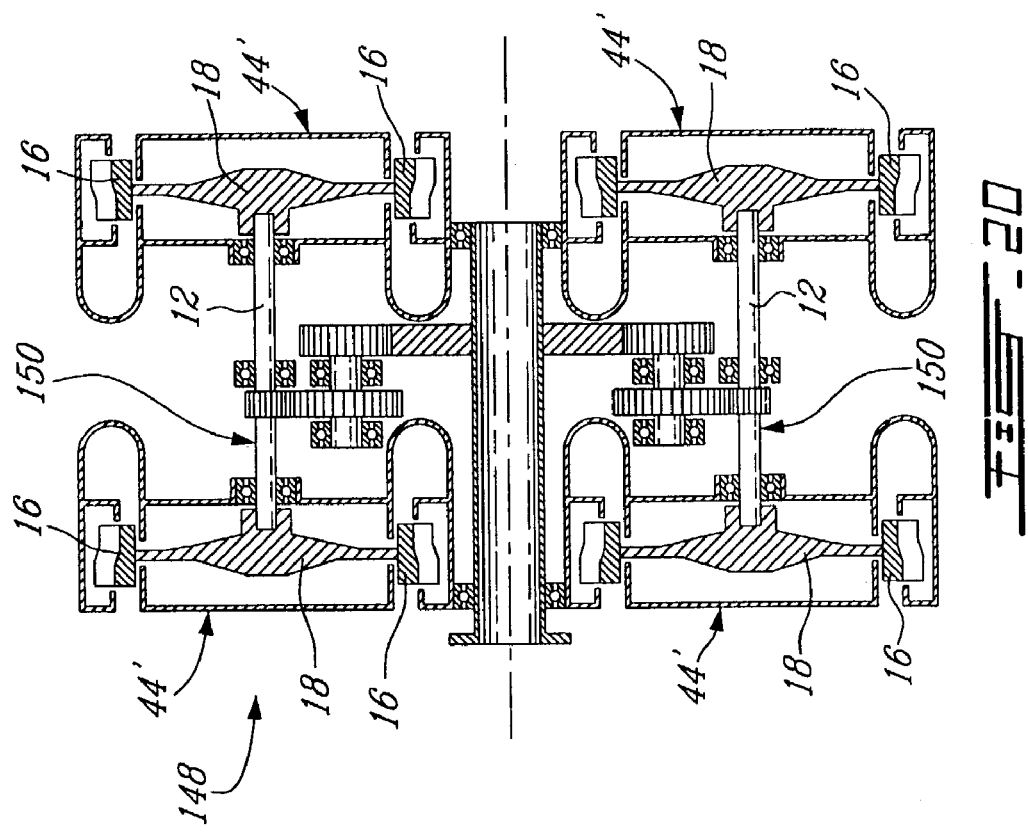
FIG. 20, in a schematic partially axially transverse cross-sectional view, illustrates an engine assembly also part of the present invention, including four rotary ramjet engines in accordance with an embodiment of the present invention.

Referring now more specifically to FIG. 20, there is shown a quad rotor engine 148 in accordance with an embodiment of the present invention. The quad rotor engine 148 is substantially similar to the hereinabove disclosed rotary ramjet engine 10 and, hence, similar reference numerals will be used to denote similar components. One of the main differences between the quad rotor engine 148 and the rotary ramjet engine 10 resides in that the quad rotor engine 148 uses four distinct rotor components 18 and associated peripheral ramjets 16 allowing for a proportional specific power increase in the order of 25% compared to the rotary ramjet engine 10.

Also, the coupling of two rotors 18 on the same driving shaft 12 eliminates the necessity to support the rotor 18 with bearings or similar components on each side of the rotors 18. Accordingly, the cowling or casing 44 can be made relatively lighter since it does not need to provide structural support, merely providing a protective wall for separation from the external environment.

Yet another advantage of coupling the pair of rotors 18 through a common driving shaft 12 is the cancellation of the parasital axial loads by symmetry. Still furthermore, a reduction gear box 150, typically of the planetary type, may also be made substantially lighter since it is located at the centre of the common output shaft 12. Hence, it allows the use of a compact structural housing 44' integrating all of the rotating components of the reduction gear boxes 150 and rotor shafts 12. Such a housing 44' may provide a weight reduction in the order of 80% compared to the housing 44 of the one-rotor rotary ramjet engine 10.

Still furthermore, the vectors of the angular momentum of the rotors 18 could cancel each other out by having output shafts 12 coupled to opposite rotors 18 rotate in opposite direction relative to each other. Accordingly, such an engine would be less subjected to gyroscopic effects linked to the angular momentum change during an angular manoeuvre.

Figure 22:
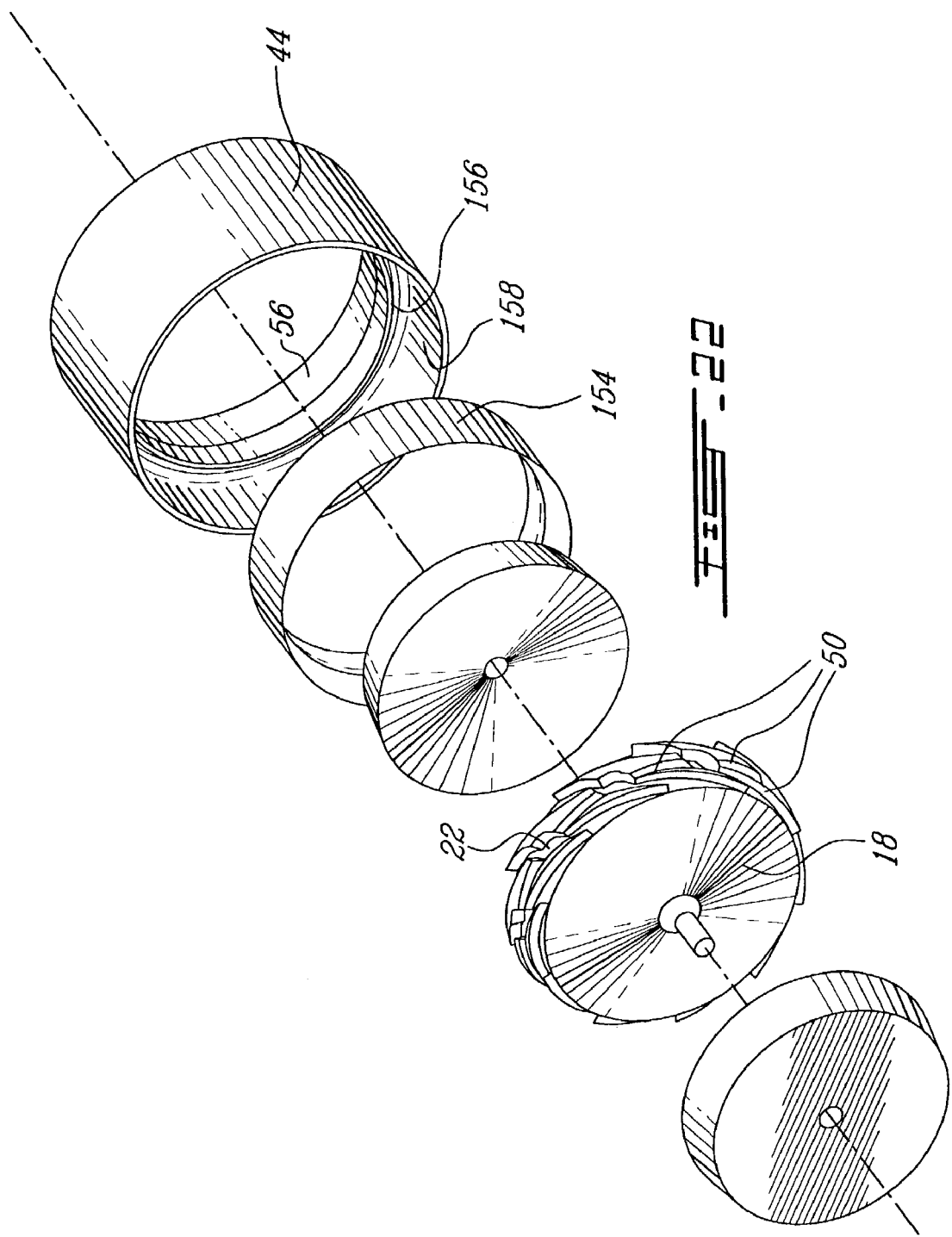
FIG. 22, in an exploded view, illustrates a rotary ramjet engine in accordance with yet another embodiment of the invention and, FIG. 23, in an axial cross-sectional view, illustrates the relationship between some of the components of the rotary ramjet engine shown in FIG. 22.
Figure 23:
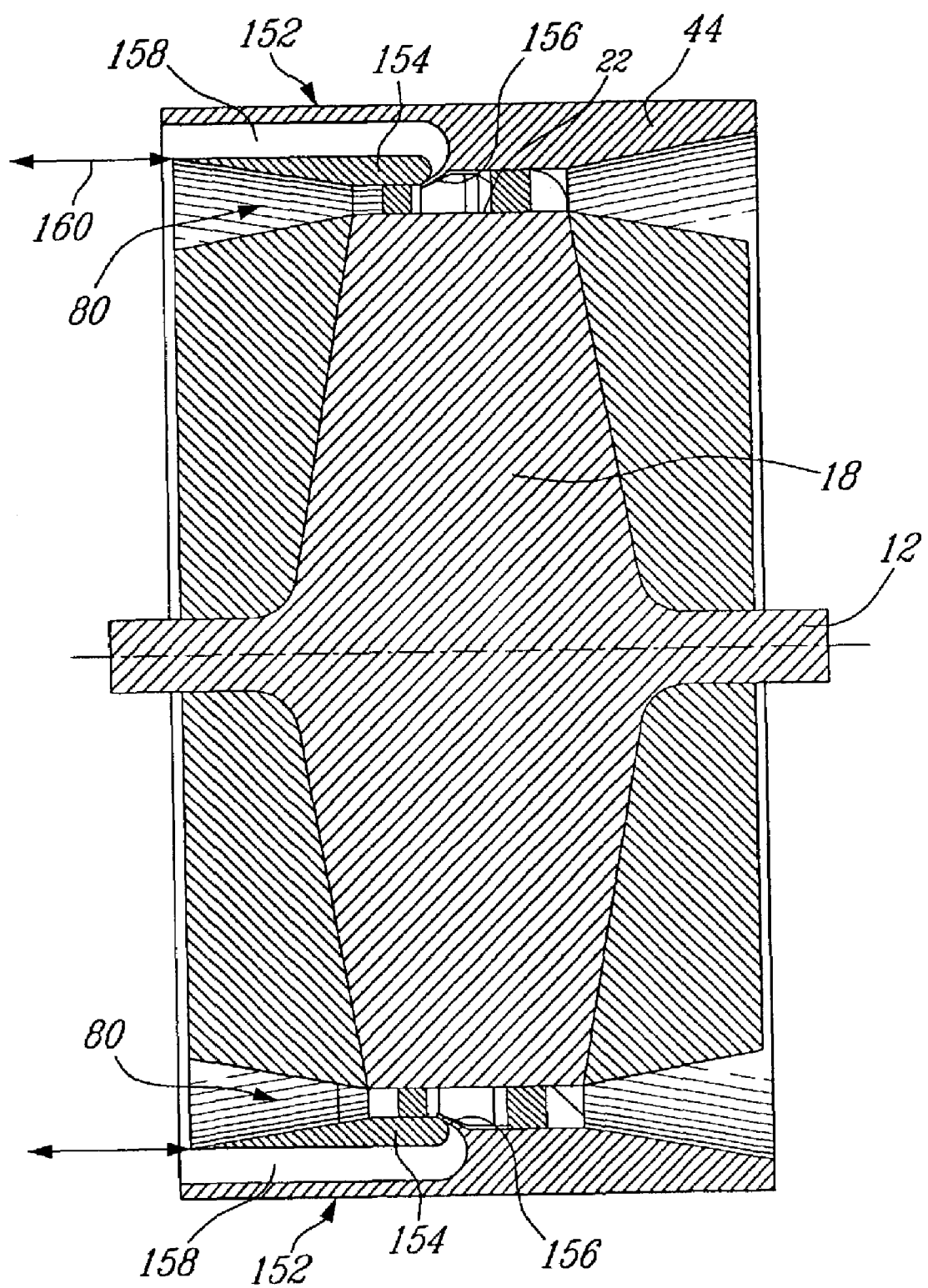

Referring now more specifically to FIGS. 22 and 23, there is shown a rotary ramjet engine 10' in accordance with yet another alternative embodiment of the invention. The engine 10' is substantially similar to the engine 10 and, hence, similar reference numerals will be used to denote similar components. Two of the main differences between the engines 10 and 10' resides in that the guiding blades of the engine 10' extend substantially radially from the rotor outer peripheral edge 22 in a direction leading radially outwardly instead of extending from the thruster base 32 in a direction leading radially inwardly.

Consequently, pressure values at the guiding blade interface with its supporting structure may be higher. Also, since the flow guiding blades 50 must be supported along their entire length by the rotor outer peripheral surface 22 and since the rotor 18 must compensate for centrifugal forces generated on the rotor 18 and the flow guiding blades 50 during rotation thereof, the size and mass of the rotor 18 part of the engine 10' are substantially greater then that of the engine 10.

Although the specific power of the engine 10' is expected to be substantially less impressive then that of the engine 10, the engine 10' nevertheless is usefull, for example, in the making of more easily available prototype models for studying the fluid dynamics of the thrusters 16. It is indeed expected that the fluid dynamics of the thrusters 16 will remain substantially similar for both the engines 10 and 10'.

Another main difference between the engines 10 and 10' resides in that the engine 10' is provided with a variable geometry inlet diffuser 80' having a sleeve valve 152 including a movable diffuser ring 154 instead of the perforated inlet diffuser 80 of the engine 10 having bleeding apertures 106. As shown more specifically in FIG. 23, the sleeve valve 152 also includes a circumferential valve seat 156 extending between the inlet diffuser 80 and a circumferential bleeding channel 158.

As indicated by arrows 160, the diffuser ring 154 is movable axially using a suitable diffuser ring moving means (not shown) for selectively restraining or blocking the flow of bleeding fluid from the inlet diffuser across the valve seat 156 and into the bleeding channel 158. Apart from functional differences resulting inherently from the above-mentioned structural differences, the operation of the engine 10' is substantially similar to that of the engine 10 and, hence, will not be further disclosed.

The present invention also relates to a method for optimizing the performance of a rotary ramjet engine as hereinabove disclosed for a particular application and size. The method involves estimating a maximum operational rotational speed taking into consideration the limits set by the strength of the materials as a function of both the geometric characteristics of the components and the mechanical properties of the materials used for manufacturing such components.

The method also involves determining an inlet Mach number for a predetermined efficiency range (the Mach number being defined as the ratio of flow speed at the inlet, measured in the reference frame of the rotor, over the speed of sound of the inlet gas).

Once the maximum operational rotational speed and the Mach number have been determined taking into consideration respectively the strength of materials and a target efficiency, the desired speed of sound of the inlet fluid is determined. The method further involves controlling the speed of sound of the inlet fluid by controlling the nature and relative proportion of the fuel and oxidizer.

Indeed, the engine 10 may be operated at various Mach numbers depending on the type of fuel used and on other variables such as the use of a premixed fuel-air mixture as opposed to a fuel mixed with a fluid such as air within the engine. For example, when pre-mixed hydrogen is used together with a perforated inlet diffuser 80 the operational inlet limit Mach number may vary between 1.86 and 2.6. With a variable diffuser the operational range may vary between Mach 1 and 2.6.

With a pre-mixed stoichiometric mixture containing gaseous octane upper limits may reach values in the neighborhood of Mach 4 or 5 since the speed of sound of the mixture is substantially reduced. The use of octane as fuel would also allow for a substantial reduction in the rotational speed of the engine. This reduction in rotational speed could, in turn, allow for the use of more conventional materials such as metals or ceramics for building prototypes or actual models.

Although the present invention has been described hereinabove by way of preferred embodiments thereof, it can be modified, without departing from the spirit and nature of the subject invention as defined in the appended claims.

What is claimed is:

1. A rotary ramjet engine for producing an output power about an output shaft, said output shaft extending substantially along a shaft axis, said engine comprising:

an annular shape thruster base defining a radially inwardly located thruster base inner surface and an opposed radially outwardly located thruster base outer surface; the thruster base including at least one thruster extending substantially radially and inwardly from the thruster base inner surface; the thruster base being disposed for rotary motion along a substantially circular thruster path positioned in a rotary plane substantially perpendicular to said shaft axis, said thruster base being capable of generating a thruster torque about said shaft axis, said thruster base generating a thruster centrifugal force acting thereon when rotating along said thruster path;

a mechanical thruster-to-shaft coupling means operatively coupled to both said thruster base and said output shaft for transmitting said thruster torque to said output shaft;

a centrifugal force compensating and annular-shaped reinforcement wall operatively coupled to said thruster base for reacting to said centrifugal force and compensating for the latter so as to maintain said thruster base in said thruster path when said thruster base is rotated in said rotary plane; said annular-shaped reinforcement wall being a piece distinct from the thruster base and from the mechanical thruster-to-shaft coupling means; said annular-shaped reinforcement wall defining a radially inwardly located reinforcement wall inner surface; said annular-shaped reinforcement wall being so configured that at least a portion of said inner surface of the reinforcement wall is in abutting contact with said thruster base outer surface; said reinforcement wall including a one-dimensional carbon-based composite material, whereby said mechanical thruster-to-shaft coupling means and said centrifugal force compensating and annular-shaped reinforcement wall are allowed to perform their respective force transmitting and compensating function substantially independently from each other so as to substantially reduce the need for said mechanical thruster-to-shaft coupling means to react to and compensate for said centrifugal force.

2. An engine as recited in claim 1, wherein said mechanical thruster-to-shaft coupling means includes:
    a mechanical coupling component configured and sized for extending substantially radially between said output shaft and said thruster base;
    a coupling component-to-thruster attachment means for attaching said mechanical coupling component to said thruster base;
    a coupling component-to-shaft attachment means for attaching said coupling component to said output shaft.

3. An engine as recited in claim 2, wherein said thruster-to-shaft coupling means allows said thruster base and said mechanical coupling component to expand and retract substantially radially and substantially independently from each other.

4. An engine as recited in claim 2, wherein:
    said mechanical coupling component defines a radially innermost located coupling component inner edge and a radially outermost located coupling component outer edge;
    said coupling component-to-shaft attachment means allowing said shaft to be attached to said mechanical coupling component substantially adjacent to said coupling component inner edge;
    said coupling component-to-thruster attachment means allowing said thruster base to be attached to said mechanical coupling component substantially adjacent to said coupling component outer edge;
    said coupling component-to-thruster attachment means allowing said mechanical coupling component and said thruster base to rotate solidarly with each other while allowing for a relative radial movement between said coupling component outer edge and said thruster.

5. An engine as recited in claim 4, wherein said coupling component-to-thruster attachment means includes an interengaging tongue and groove combination extending between said coupling component outer edge and said thruster base, said tongue and groove combination being configured and sized for maintaining said tongue in operational contact with said groove while allowing relative movement between said tongue and said groove in a substantially radial direction and preventing relative movement between said tongue and said groove in other directions.

6. An engine as recited in claim 5, wherein said tongue extends substantially radially from said coupling component outer edge and said groove is formed in part of said thruster base.

7. An engine as recited in claim 5, wherein said tongue has a substantially parallelepiped-shaped tongue configuration and wherein said groove has a substantially complimentary parallelepiped shaped groove configuration.

8. An engine as recited in claim 2, wherein said mechanical coupling component includes a generally disc-shaped rotor defining a pair of opposed rotor side surfaces and a radially outermost rotor peripheral surface, said rotor defining a rotor rotational axis, said rotor rotational axis being in a substantially collinear relationship relative to said shaft axis, said rotor being rotatable about said rotor rotational axis.

9. An engine as recited in claim 8, wherein said coupling component-to-thruster attachment means includes:
    a tongue extending integrally and substantially radially from said rotor peripheral surface;
    a groove formed in part of said thruster base, said tongue and groove being configured and sized for maintaining said tongue in operational contact with said groove while allowing relative movement between said tongue and said groove in a substantially radial direction and preventing relative movement between said tongue and said groove in other directions.

10. An engine as recited in claim 8, wherein said rotor side surfaces are configured to reduce aerodynamical drag thereon when said rotor is rotated about said rotor rotational axis.

11. An engine as recited in claim 8, wherein the cross-sectional configuration of said rotor is dividable into a pair of rotor cross-section half portions, said rotor cross-section half portions being substantially symmetrically configured and positioned relative to said rotor rotational axis, each of said rotor cross-section half portions defining a half portion proximal region and an integrally extending half portion distal region located respectively radially proximally and distally relative to said rotor rotational axis, said half portion proximal region having a substantially frusto-triangular configuration tapering radially outwardly and said half portion distal region having a substantially rectangular configuration.

12. An engine as recited in claim 8 further comprising:
    a vacuum creating means fluidly coupled to said engine for creating at least a partial vacuum substantially adjacent at least a portion of at least one of said rotor side surfaces.

13. An engine as recited in claim 8, wherein:
    said rotor peripheral surface defines a rotor peripheral surface axial length in a direction substantially parallel to said rotor rotational axis;
    said thruster defines a thruster axial length in a direction substantially parallel to said shaft axis;
    said thruster axial length being greater than said rotor peripheral surface axial length.

14. An engine as recited in claim 8, wherein said rotor is provided with a rotor cooling channel extending at least partially therethrough, said rotor cooling channel defining a rotor cooling channel outlet end for discharging a cooling fluid substantially adjacent said rotor peripheral surface.

15. An engine as recited in claim 14 further comprising:
a thruster base cooling channel extending at least partially through said thruster base, said thruster base cooling channel defining a thruster base cooling channel inlet end and a thruster base cooling channel outlet end, said thruster base cooling channel inlet end being in fluid communication with said rotor cooling channel outlet end and said thruster cooling channel outlet end being located adjacent said annular-shaped reinforcement wall for discharging said cooling fluid adjacent an interface between said thruster base outer surface and said annular-shaped reinforcement wall inner surface.

16. An engine as recited in claim 14, wherein said rotor cooling channel defines a rotor cooling channel inlet end located substantially adjacent said rotor rotational axis, said rotor inlet end being in fluid communication with the external environment adjacent said rotor rotational axis, said rotor cooling channel extending substantially radially between said rotor cooling channel inlet and outlet ends; whereby said rotor cooling channel allows a cooling fluid in the external environment adjacent said rotor cooling channel to be centrifugally pumped through said rotor cooling channel and discharged through said rotor cooling channel outlet end when said rotor is rotated about said rotor rotational axis.

17. An engine as recited in claim 16, wherein:
said output shaft has a shaft cooling channel extending substantially longitudinally and at least partially therethrough, said shaft cooling channel being in fluid communication with a radially disposed shaft fluid discharge aperture;
said rotor has a substantially centrally located shaft receiving aperture extending therethrough, said shaft receiving aperture being configured and sized for substantially fittingly receiving said output shaft;
said rotor cooling channel inlet end leads into said shaft receiving aperture and is positionable in fluid communication with said shaft fluid aperture;
whereby upon said rotor being rotated about said rotor rotational axis, said cooling fluid is pumped centrifugally through said shaft and rotor cooling channels.

18. An engine as recited in claim 8, wherein said rotor is made out of a carbon/carbon composite material coated with a substantially oxidation resistant coating.

19. An engine as recited in claim 18, wherein said oxidation resistant coating includes silicium carbide and tetra-ethyl-ortho-silicate.

20. An engine as recited in claim 1 further comprising:
a cooling means for cooling said reinforcement wall.

21. An engine as recited in claim 1, wherein said one-dimensional carbon-based composite material includes a matrix made of epoxy.

22. An engine as recited in claim 1, wherein said one-dimensional carbon-based composite material includes a matrix made of a polyimide.

23. An engine as recited in claim 1, wherein said reinforcement wall is made out of coiled carbon fibers.

24. An engine as recited in claim 1, wherein:
said mechanical thruster-to-shaft coupling means includes a generally disc-shaped rotor defining a pair of opposed rotor side surfaces and a radially outermost rotor peripheral surface, said rotor peripheral surface defining a rotor peripheral surface axial length in a direction substantially parallel to said rotor rotational axis;
said thruster base defines a thruster base axial length in a direction substantially parallel to said shaft axis;
said thruster base axial length being greater than said rotor peripheral surface axial length.

25. An engine as recited in claim 1, wherein said at least one thruster is a shock wave compression thruster.

26. An engine as recited in claim 25, wherein said at least one thruster is a ramjet thruster.

* * * * *